United States Patent
Mousseau et al.

(10) Patent No.: US 12,229,749 B2
(45) Date of Patent: Feb. 18, 2025

(54) SYSTEMS METHODS AND DEVICES FOR INCREASING SECURITY WHEN USING SMARTCARDS

(71) Applicant: 10353744 Canada Ltd., Kitchener (CA)

(72) Inventors: Gary Mousseau, Waterloo (CA); Mark Church, Waterloo (CA); Marcus Edwards, Waterloo (CA)

(73) Assignee: Elpis Technologies Inc., Kitchener (CA)

( * ) Notice: Subject to any disclaimer, the term of this patent is extended or adjusted under 35 U.S.C. 154(b) by 165 days.

(21) Appl. No.: 17/089,543

(22) Filed: Nov. 4, 2020

(65) Prior Publication Data
US 2021/0133725 A1 May 6, 2021

Related U.S. Application Data

(60) Provisional application No. 62/930,139, filed on Nov. 4, 2019.

(51) Int. Cl.
*G06Q 20/34* (2012.01)
*G06K 19/07* (2006.01)
(Continued)

(52) U.S. Cl.
CPC ....... *G06Q 20/341* (2013.01); *G06K 19/0718* (2013.01); *G06K 19/0719* (2013.01);
(Continued)

(58) Field of Classification Search
None
See application file for complete search history.

(56) References Cited

U.S. PATENT DOCUMENTS

| | | | | |
|---|---|---|---|---|
| 10,601,232 | B1 * | 3/2020 | Wurmfeld | G07F 7/0853 |
| 2006/0224504 | A1 * | 10/2006 | Nwosu | G06Q 20/12 |
| | | | | 705/67 |

(Continued)

FOREIGN PATENT DOCUMENTS

| WO | WO-0203301 A1 * | 1/2002 | ............. G06Q 20/24 |
|---|---|---|---|

OTHER PUBLICATIONS

Fang, Shih-Chin, Human Identification by Quantifying Similarity and Dissimilarity in Electrocardiogram Phase Space, Feb. 24, 2008, Elsevier, Pattern Recognition 42, 1824-1831 (Year: 2008).*

(Continued)

*Primary Examiner* — Neha Patel
*Assistant Examiner* — Nicholas K Phan
(74) *Attorney, Agent, or Firm* — Own Innovation; James W. Hinton

(57) ABSTRACT

Provided are systems, methods and devices for increasing security in a financial transaction when using a smartcard. The system includes a smartcard for payment in a financial transaction, the smartcard having a memory for storing a first actuation sequence for confirming a user's identity; wherein the smartcard has a checking module that authorizes the transaction only when a second actuation sequence is identical to the first actuation sequence stored in the memory; a point of sale terminal for recording payment details from the smartcard once the financial transaction is authorized and transmitting a request for payment through a network to a financial institution according to the payment details; and a financial institution authorizing computer for allowing recording of an actuation sequence on the smartcard and making payment to the owner of the point of sale terminal once the transaction is authorized, according to the payment details.

20 Claims, 20 Drawing Sheets

(51) Int. Cl.
*G06Q 20/20* (2012.01)
*G06Q 20/40* (2012.01)

(52) U.S. Cl.
CPC ..... *G06Q 20/204* (2013.01); *G06Q 20/40145* (2013.01); *G06Q 20/4037* (2013.01); *G06Q 20/409* (2013.01)

(56) References Cited

U.S. PATENT DOCUMENTS

| | | | |
|---|---|---|---|
| 2012/0293303 A1* | 11/2012 | Khan | G06Q 20/322 340/5.82 |
| 2019/0268159 A1* | 8/2019 | High | H04L 9/3231 |
| 2020/0042907 A1* | 2/2020 | Anichini | H04W 4/33 |
| 2020/0111094 A1* | 4/2020 | Maheshwari | H04L 63/0861 |

OTHER PUBLICATIONS

NXP Semiconductors, "AN12057 Making reader infrastructures ready for multi-application cards and devices", Oct. 17, 2017.
NXP Semiconductors, "MF3ICD(H)Q1 Mifare DESFire EV1 256B contactless smartcard IC Product short data sheet", Nov. 5, 2015.
Wu et al., "Research on mobile payment based on connection of NFC and SIM card", BioTechnology an Indian Journal, 10(19), 2014.

* cited by examiner ical field

SYSTEMS METHODS AND DEVICES FOR INCREASING SECURITY WHEN USING SMARTCARDS

TECHNICAL FIELD

The embodiments disclosed herein relate to smartcard security, and, in particular to systems, methods, and devices for securing smartcards.

INTRODUCTION

The use of credit and debit smartcard transactions is well known. Smartcards have embedded microcontrollers, memory chips, tamper-proof storage elements, and secure elements that have improved the security of financial transactions. Often, the memory and processing functions are integrated onto a single integrated circuit (IC). Newer smartcards have internal batteries, lights, and buttons. Credit card companies have even added card verification codes (CVC) and card verification values (CVV) on the back of most credit cards. These are simple ways that others have adopted to address some of the common ways thieves are abusing the credit card industry. The development of near field communication (NFC) and contactless or "TAP" methods of payment is on the rise within retail establishments. The contactless methods are quick, easy, and reduce the spread of germs. However, there are risks when allowing contactless smartcards to operate. Some of these risks include new methods of eavesdropping, a risk of card theft, or card cloning, which can lead to performing TAP transactions easily. Additionally, the rise of "Card not present" fraud is one of the biggest problems in the credit card industry, and theft of card information is on the rise.

There has emerged another theft method when using the smartcard and entering a Personal Identification Number (PIN). This new theft approach is an over-the-shoulder method to see a person entering their PIN into the POS terminal. Once the PIN is known the thief then steals the smartcard, gaining access to much greater sums of money. To reduce these risks, credit and debit card companies have placed limits on individual TAP transactions and have placed various limits on PIN-based smartcard transactions. For example, in many locations individual TAP transactions cannot exceed 100 dollars. These limits are a clear admission that the security risks are high. Despite these risks, the average consumer loves the ease and simplicity of the purchase process using TAP. From a hygiene point of view, the elimination of physical currency and the elimination of physically touching point of sale (POS) keypads is also a major advantage. Given the personal wealth of many users, the purchase limits on credit and debit cards are relatively low. The limits placed on these smartcards help to reduce loss to the credit and debit card companies.

Another popular theft technique is credit card skimming. Using a skimming machine, which appears to be a legitimate POS terminal, the thief collects credit card information that passes through it and uses that information at a later time. Thieves can also use RFID scanners to read card information directly from a purse or pocket if the thief is close enough to the victim. To complement this theft, the thief can also use a thermo-imaging device to read the heat signatures off PIN pads at point of sale terminals. These optical attacks with thermo-imaging capabilities make even entering a PIN value risky. When the perpetrator has a camera in place or can get to the terminal within seconds after the transaction, the user of the card is at high risk of theft and card cloning issues.

With the advantages of smartcards, especially the contactless smartcards, there needs to be an improved security method when using them. As open banking grows and expands into the market, additional security controls will be more important than ever. As technology has evolved, the security has not kept pace, and the newer self-powered smartcards offer many new advantages that are unprecedented. When utilizing the newer NFC TAP method for payment, there is no security on a smartcard to verify anything about the person holding the card at the time of the transaction.

One or more methods are desired to improve the security of basic smartcard and TAP smartcard transactions and make them more viable for use in financial transactions where greater financial purchases are involved. Accordingly, there is a need for systems and methods for increasing security when using a smart card.

SUMMARY

Embodiments relate to the creation of an identification method to increase security when using debit and credit smartcards for financial transactions, alternately known as financial transaction cards. The identification method may add a step to authorization for the use of the smartcard prior to allowing any data exchanges with a point of sale (POS) terminal. Authorization may also enable communications when using the specialized radio frequency identification (RFID), for example the technology known as near field communications (NFC), such as ISO/IEC 14443. When using this NFC contactless method for payment of a financial transaction, the embodiments of the disclosure may allow activation of the NFC protocols needed to complete the TAP transaction. The embodiments may include various methods to identify the card holder and allow greater security and In an embodiment permit increased spending limits on financial transactions.

In an embodiment, there is a system of computers for increasing security in a financial transaction when using a smartcard, the system of computers comprising a smartcard for payment in a financial transaction, the smartcard having a memory for storing a first actuation sequence for confirming a user's identity; the smartcard has a checking module that authorizes the transaction only when a second actuation sequence is identical to the first actuation sequence stored in the memory; a point of sale terminal for recording payment details from the smartcard once the financial transaction is authorized and transmitting a request for payment through a network to a financial institution according to the payment details; and a financial institution authorizing computer for allowing recording of an actuation sequence on the smartcard and making payment to the owner of the point of sale terminal once the transaction is authorized, according to the payment details.

In an embodiment, there is a system of computers for increasing security in a financial transaction when using a smartcard, the system of computers comprising a smartcard for payment in a financial transaction, the smartcard having a memory for storing a first actuation sequence for confirming a user's identity; the smartcard has a checking module that authorizes the transaction only when a second actuation sequence is identical to a first actuation sequence stored in the memory; a point of sale terminal for recording payment details from the smartcard once the financial transaction is authorized and transmit a request for payment.

In an embodiment, there is a system of computers for increasing security in a financial transaction when using a smartcard, the system of computers comprising a smartcard for payment in a financial transaction, the smartcard having a memory for storing an actuation sequence for confirming a user's identity; the smartcard has a checking module that authorizes the transaction only when a second actuation sequence is identical to a first actuation sequence stored in the memory; and a financial institution authorizing computer for allowing recording of an actuation sequence on the smartcard and making payment once the transaction is authorized, according to payment details.

In an embodiment, there is a system of computers for increasing security in a financial transaction, the system of computers comprising a point of sale terminal for recording payment details from a user once the financial transaction is authorized according to information provided by the user to confirm the user's identity and transmit a request for payment through a network to a financial institution according to the payment details; and a financial institution authorizing computer for allowing recording of an actuation sequence associated with the user and making payment to the owner of the point of sale terminal once the transaction is authorized, according to the payment details.

In an embodiment, there is a method for a smartcard owner to authorize the use of a smartcard for financial transactions, the method comprising providing circuitry to enable detection and storage of a first actuation sequence performed by the owner of the smartcard; storing the first actuation sequence on the smartcard while the smartcard is connected to an authorizing computer to indicate authorization; performing a second actuation sequence with the smartcard to authorize financial transactions with the smartcard at a point of sale terminal; with authorization confirmed, the smartcard will perform the financial transactions with the point of sale terminal, and without authorization, the smartcard will fail to perform any financial transactions.

In an embodiment, there is a method for increasing security in a financial transaction when using a smartcard at a point of sale terminal, the method comprising storing a first actuation sequence on the smartcard; receiving a performed second actuation sequence at the smartcard; and matching the second actuation sequence to the stored first actuation sequence with a checking module to authorize a financial transaction. The financial transaction is allowed to proceed at the point of sale terminal when the second actuation sequence matches the stored first actuation sequence, and the financial transaction is blocked from proceeding at the point of sale terminal when the second actuation sequence fails to match the stored first actuation sequence.

In an embodiment, there is a method for activating a smartcard for financial transactions using a second actuation sequence, the method comprising detecting a first actuation sequence on a smartcard; receiving the first actuation sequence on the smartcard indicating authorization via an authorizing computer; encoding the first actuation sequence as an algorithm on the smartcard at the authorizing computer such that the first actuation sequence is not stored in a readable form on the card; and matching a second actuation sequence to the stored first actuation sequence according to the encoded algorithm with a checking module to authorize a financial transaction. The financial transaction is allowed to proceed when the second actuation sequence matches the stored first actuation sequence, and the financial transaction is blocked from proceeding when the second actuation sequence fails to match the stored first actuation sequence.

In an embodiment, there is a method for adding an additional security step to a smartcard to authorize its use for financial transactions, the method comprising providing an interface on the smartcard to receive a first actuation sequence; storing the first actuation sequence within the smartcard by using an authorizing computer associated to the smartcard; and attempting to enable the smartcard by performing a second actuation sequence using the interface on the smartcard to match the stored first actuation sequence. When a match is detected between the first and second actuation sequences according to a checking module, the smartcard will perform the financial transaction, and when a match is not detected between the first and second actuation sequences according to the checking module, the smartcard will fail to perform any financial transaction.

In an embodiment, there is a method of enabling use of a smartcard by a user for financial transactions, the method comprising: providing an actuation detection mechanism housed within the smartcard to receive a first actuation sequence; using the mechanism to create the stored first actuation sequence within the smartcard when the user performs the first actuation sequence on the smartcard and the smartcard is coupled to an authorizing computer system; attempting to match a second actuation sequence to the stored first actuation sequence when the second actuation sequence is detected by the mechanism and the smartcard is not in proximity to an authorizing computer system; allowing a financial transaction to take place when a successful match is achieved according to a checking module; and blocking the financial transaction when the successful match is not achieved.

In an embodiment, there is a method of increasing security in a financial transaction when using a point of sale terminal, the method comprising: a financial institution authorizing computer allowing recording of an actuation sequence associated with the user; a point of sale terminal recording payment details from a user once the financial transaction is authorized according to information provided by the user to confirm the user's identity; the point of sale terminal transmitting a request for payment through a network to a financial institution according to the payment details; and the financial institution making payment to the owner of the point of sale terminal once the transaction is authorized, according to the payment details.

In an embodiment, there is a smartcard for verifying user identity in a financial transaction, the smartcard comprising a secure memory for storing a first actuation sequence and an input module for receiving a second actuation sequence. The input module can receive the second actuation sequence from the user of the smartcard to verify user identity at the time of the financial transaction. The smartcard further comprises a checking module for comparing the first actuation sequence with the second actuation sequence, and a point of sale communication module for receiving and transmitting electronic information between a point of sale terminal and the smartcard.

In an embodiment, there is an authorizing computer for facilitating storage of an actuation sequence on a smartcard the authorization computer including: an interface for connecting with a smartcard and a processor for allowing a user to store an actuation sequence on the smartcard. The processor can determine whether the actuation sequence was recorded by the smartcard, the processor can determine that the user needs to repeat the actuation sequence, and the processor controls the authorization computer to signal success to the user once the actuation sequence is recorded by the smartcard. The authorizing computer enables the smartcard to accept the stored actuation sequence in subsequent financial transactions.

In an embodiment, there is a point of sale terminal for facilitating a financial transaction with a smartcard, the terminal comprising: an input module for receiving authentication data from a smartcard in the financial transaction to confirm the identity of a user of the smartcard. The input module can further receive payment details from the smartcard for transmission through a network to a financial institution of the smartcard to ensure payment, and the payment details include an amount of money to be paid. The terminal further comprises a financial institution communication module for requesting payment through the network from the financial institution of the smartcard upon successful completion of the financial transaction. The financial institution communication module can further query the financial institution of the smartcard for validity information as to the validity of the smartcard and to receive the validity information. The terminal further comprises a processor for approving the financial transaction if the authentication data received from the smartcard confirms the identity of the user of the smartcard and the validity information received from the financial institution of the smartcard confirms the validity of the smartcard.

In an embodiment, there is a biosensor for reading biometric information of a user of a smartcard, the biosensor comprising a sensing module for receiving biometric information of the user and a communication module for transmitting received biometric information of the user to a smartcard associated with the user in order to confirm the user's identity. The biosensor is worn on the user's person, and the biosensor can be associated to a smartcard only when in the presence of an authorizing computer.

In an embodiment, there is a method for verifying that a purchaser at a point of sale terminal is the legitimate owner of a smartcard, the method comprising connecting a smartcard to the point of sale terminal; connecting a second verification device to the smartcard. The second verification device is a device for verifying the user. The method further comprises receiving and transmitting electronic information between the point of sale terminal and the smartcard and enabling a transaction to be completed with the smartcard only if the second verification device is detected to be present.

The second actuation sequence may be a series of finger taps made against one or more touch-sensitive pads located on the smartcard.

The second actuation sequence may take place through a series of taps performed each time the smartcard touches a contactless-enabled POS terminal.

The second actuation sequence may occur by tracing out a pattern on a touch enabled part of the smartcard.

The second actuation sequence may occur when a sub-dermal implant is brought within close proximity of the smartcard.

The smartcard may be a powered smartcard with an internal power source.

The powered smartcard may include at least one of a small LED light and sound alert that can be activated when the smartcard is authorized.

The powered smartcard may include at least one of a small LED light and sound alert that can be activated when an authorization attempt fails.

The sub-dermal implant may be powered through NFC inductive coupling techniques from the smartcard.

The smartcard may be a passive smartcard.

The passive smartcard may include an LED light that can be illuminated when the smartcard is brought into proximity to a POS terminal and it is authorized.

The passive smartcard may include an LED light that can be illuminated when the smartcard is brought into proximity to a POS terminal and authorization fails.

A predetermined number of failures to perform the correct second actuation sequence may result in the smartcard going dormant for a period of time.

The POS terminal may signal success of the financial transaction by displaying a message that the transaction is being processed.

The smartcard may contain an enable button, and only after a step of depressing the enable button can the second actuation sequence be performed.

The smartcard may harvest and save power during any physical contact made with a point of sale terminal.

The performing of the second actuation sequence may be done using a contactless or NFC method of data exchange.

The performing of the second actuation sequence may be done using an insertion or contact method of data exchange.

The smartcard user may perform both the second actuation sequence and a PIN entry to authorize the financial transaction.

Each actuation sequence may occur when a smartcard is brought into close proximity to an ECG bio-sensor measuring the user's heart rhythm or cardiac waveform.

Each actuation sequence may occur when a smartcard is brought into close proximity to an EEG bio-sensor measuring brain wave patterns.

The second actuation sequence may occur when one or more actuation sequences are combined to activate the smartcard.

Use of the second actuation sequence by the user may be mandatory for all transactions beyond a preset minimum dollar amount.

Use of the second actuation sequence by the user may be optional.

The authorizing computer may be an ATM or other bank machine.

The authorizing computer may be a special-purpose bank computer designed for updating the security settings of the smartcard.

The second actuation sequence may include the user performing a series of mechanical taps against the POS terminal to identify themselves as the smartcard owner.

The series of mechanical taps performed may include long, short, or a combination of long and short taps combined.

Energy may be harvested over NFC, or though insertion of the smartcard at the POS terminal, or through making contact with the smartcard with the POS terminal, from the POS terminal to power the smartcard.

All matching may be done locally on the smartcard, and no actuation sequence information may be transmitted to the point of sale terminal.

Matching may be at least partially done on the point of sale terminal and some actuation sequence information may be transmitted to the point of sale terminal.

The second actuation sequence may occur before the smartcard is brought into close proximity of the point of sale terminal.

The second actuation sequence may occur immediately after the smartcard is brought into close proximity of the point of sale terminal.

The successful second actuation sequence may allow only one financial transaction to be completed with the smartcard.

The successful second actuation sequence may allow an unlimited number of financial transactions to be completed with the smartcard within a timeframe previously agreed upon by the user, the financial institution, or both.

The point of sale terminal may print a physical receipt with the payment details upon successful completion of the financial transaction.

The point of sale terminal may query the financial institution of the smartcard as to the sufficiency of funds in one or more accounts of the user.

The point of sale terminal may proceed with the financial transaction only if the sufficiency of funds in the one or more accounts of the user is confirmed.

The smartcard may have a fingerprint reader and may use a secure enclave method to confirm the user's fingerprint matches the owner's fingerprint.

The smartcard may have a camera and may be able to perform facial recognition or an iris scan to confirm the cardholder is the owner of the smartcard.

The smartcard may harvest energy from the POS terminal or other charging system each time a tap is performed.

The harvested energy may be stored at a short-term power storage element of the smartcard.

The short-term power storage element may be a supercapacitor.

The short-term power storage element may be able to be charged or activated by power from a powering coil on a mobile phone or in a powering coil installed near the POS terminal.

The short-term power storage element may be able to provide power to the entire smartcard.

Biometric information of users may be identified using spatial correlations in phase-space, the phase-space representation of a signal being constructed in real-time by delaying the signal by three distinct amounts to create three axes of the phase-space.

The biometric information of users may comprise a heart rhythm or cardiac waveform of the user, and the signal may comprise heart rhythm or cardiac waveform information of the user.

The second actuation sequence may include biometric information of a user collected by a biometric sensor.

The smartcard may contain memory for securely storing the second actuation sequence.

The smartcard may contain processing logic to interface with a POS terminal or a SPED.

The smartcard may be able to interface to a POS terminal or a SPED through an electrical contact interface.

The smartcard may be able to interface to a POS terminal or a SPED through an RFID interface.

The smartcard may be compliant with the ISO/IEC 7810 standard.

The smartcard may be compliant with the EMVco standard.

The second actuation sequence may include a sequence of a number of physical actuators or buttons The second actuation sequence may include a sequence of buttons on the smartcard depressed in a specific order.

The second actuation sequence may include a series of finger taps with a timing pattern.

A result of the matching of the second actuation sequence may be indicated through at least one of an LED lamp, a sound alert, a color change, a message on a display, and a message on the POS terminal.

The smartcard may contain a power storage element.

The power storage element may be a lithium ion battery.

The power storage element may be a super capacitor.

The smartcard may further comprise a circuit to measure a biometric waveform of the user.

The biometric waveform may be a heartbeat pulse waveform.

The biometric waveform may be the audio waveform of a spoken phrase.

The smartcard may further comprise a wire coil that can be energized by an AC magnetic field.

The smartcard may further comprise a charging means to transfer energy from the wire coil to the power storage element.

There may be a step of increasing a transaction limit of the smartcard when the second actuation sequence is successfully supplied by the user.

There may be a step of entering the first actuation sequence multiple times to ensure correctness.

There may be a step of no longer recognizing a previous actuation sequence stored on the smartcard as correct.

The step of depressing the enable button to allow the physical movement to be entered may take place before the smartcard interfaces with the point of sale terminal.

The step of depressing the enable button to allow the physical movement to be entered may take place after the smartcard interfaces with the point of sale terminal.

The second verification device may be a mobile computing device.

The second verification device may include a sensing module.

The second verification device may contain a fingerprint scanner.

The second verification device may include a camera for facial recognition.

The second verification device may contain a camera capable of iris scanning.

The second verification device may be a subdermal implant.

The second verification device may be a smart watch.

The second verification device may be a second smartcard.

The second verification device may be a security fob.

According to an embodiment, there is a method for activating a smartcard for financial transactions using an actuation sequence. The method includes providing a mechanism on a smartcard for detecting an actuation sequence, performing the actuation sequence on the smartcard at an approved location indicating authorization via an authorizing computer, storing the actuation sequence on the smartcard at the approved location, matching the actuation sequence to the stored actuation sequence to authorize a financial transaction in that, the financial transaction is allowed to proceed when the actuation sequence matches the stored actuation sequence, and the financial transaction is blocked from proceeding when the actuation sequence fails to match the stored actuation sequence. In this embodiment, any number of buttons or zones can be used, and the activation sequence can be any length. The length and complexity of the activation sequence is proportional to the required security, or value of the enabled transaction so that it becomes increasingly difficult to guess the activation sequence for higher value transactions.

According to an embodiment, there is a method for a smartcard owner to authorize the use of their smartcard for transactions. The method includes providing circuitry to enable the detection and storage of an actuation sequence performed by the owner of a smartcard, storing the actuation sequence or information related to the actuation sequence on a smartcard while connected to a computer system at an authorized location to indicate authorization via an authorizing computer and after the actuation sequence is stored, performing the actuation sequence with the smartcard to authorize financial transactions with the smartcard at a POS terminal. With authorization confirmed, the smartcard will perform the financial transactions at the POS terminal; without authorization, the smartcard will fail to perform any financial transactions.

According to an embodiment, there is a method of adding an additional security step to a smartcard to authorize its use for financial transactions. The method includes providing an interface on a smartcard to receive an actuation sequence, storing the actuation sequence within a smartcard by using an authorizing computer associated to the smartcard, and attempting to enable the smartcard by performing the actuation sequence using the interface on smartcard to match the stored actuation sequence. When a match is detected, the smartcard will perform the financial transaction; when a match is not detected, the smartcard will fail to perform any financial transaction. In an embodiment, the actuation sequence can be preset or entered at a configuration system and transferred to the smartcard.

According to an embodiment, there is a method of enabling the use of a smartcard by a user for financial transactions. The method includes providing an actuation detection mechanism housed within a smartcard to receive a first actuation sequence, using the mechanism to create a stored actuation sequence within the smartcard when the user performs the first actuation sequence on the smartcard and it is coupled to an authorizing computer system, and attempting to match a second actuation sequence to the stored actuation sequence when the second actuation sequence is detected by the mechanism and the smartcard is not in proximity to an authorizing computer system. The method provides for allowing a financial transaction to take place when a successful match is achieved and blocking a financial transaction when a successful match is not achieved.

The actuation sequence may be a series of finger taps made against one or more touch-sensitive pads located on the smartcard. The actuation sequence may include the user performing a series of mechanical taps against the POS terminal to identify themselves as the smartcard owner. The series of taps may include long, short, or a combination of long and short taps combined.

The actuation sequence may take place through a series of taps performed each time the smartcard touches a contactless-enabled POS terminal. The series of taps may include long, short, or a combination of long and short taps combined.

The actuation sequence may occur when the user depresses one or more parts of the smartcard to detect a heart rhythm or cardiac waveform.

The actuation sequence may occur by tracing out a pattern on a touch enabled part of the smartcard.

The actuation sequence may occur when a sub-dermal implant is brought within close proximity of the smartcard.

The smartcard may be a powered smartcard with an internal power source.

The powered smartcard may include at least one of a small LED light and sound alert that can be activated when the smartcard is authorized.

The powered smartcard may include at least one of a small LED light and sound alert that can be activated when an authorization attempt fails.

The sub-dermal implant may be powered through NFC inductive coupling techniques from the smartcard.

The smartcard may be a passive smartcard.

The passive smartcard may include an LED light that can be illuminated when the smartcard is brought into proximity to a POS terminal and is authorized.

The passive smartcard may include an LED light that can be illuminated when the smartcard is brought into proximity to a POS terminal and authorization fails.

The performing may be preceded by depressing a button to allow the physical movement to be entered.

The smartcard may harvest and save power during any physical contact made with a point of sale terminal. Such harvesting may occur through a charging system nearby the point of sale terminal.

The performing of financial transactions may be done using a contactless or NFC method of data exchange.

The performing of financial transactions may be done using an insertion or contact method of data exchange.

The smartcard user may perform both an actuation sequence and a PIN entry to authorize the financial transaction.

The actuation sequence may occur when a smartcard is brought into close proximity to an ECG bio-sensor measuring the user's heart rhythm.

The actuation sequence may occur when a smartcard is brought into close proximity to an EEG bio-sensor measuring brain wave patterns.

The actuation sequence may occur when one or more actuation sequences are combined to activate the smartcard.

The smartcard may contain an enable button, and only when the enable button is depressed may the actuation sequence be able to be performed.

The POS terminal may signal success of the financial transaction by displaying a message that the transaction is being processed.

Use of the actuation sequence by the user may be mandatory for all transactions beyond a preset minimum dollar amount. Use of the actuation sequence by the user may be optional. The methods may further comprise a step of increasing a transaction limit of the smartcard when the actuation sequence is successfully supplied by the user.

A predetermined number of failures to perform the correct actuation sequence may result in the smartcard going dormant for a period of time.

The authorizing computer may be an ATM or other bank machine.

The authorizing computer may be a special purpose bank computer designed for updating the security settings of the smartcard.

The smartcard may have a camera and may be able to perform facial recognition or an iris scan to confirm the cardholder is the owner of the smartcard.

The smartcard may harvest energy from the POS terminal or other charging system each time a tap is performed.

In an embodiment, there is a system for increasing security in a financial transaction when using a smartcard, the system comprising a smartcard, a point of sale terminal, a network, and a financial institution. The smartcard is configured with an actuation sequence at the financial institution and the smartcard authorizes a transaction at the point of sale terminal only when a user of the smartcard enters the actuation sequence at the time of the transaction. The point of sale terminal is configured to record payment details from the smartcard once the financial transaction is authorized and transmit a request for payment through the network to the financial institution according to the payment details. The financial institution is configured to make payment to the owner of the point of sale terminal according to the payment details.

In an embodiment, there is a client device operating in a financial transaction. The client device contains a secure element for storing data. The client device further contains an input module configured to receive data from an issuing financial institution for storage in the secure element. The input module is further configured to receive data from the user of the client device to verify user identity at the time of the financial transaction. In the embodiment, there is also a checking module for comparing data stored on the secure element with data received from the user through the user input module.

The client device may be a smartcard.

In an embodiment, there is a payee server comprising an input module, a financial institution communication module, and a processor. The input module is configured to receive authentication data from a client device in a financial transaction to confirm the identity of a user of the client device. The input module is further configured to receive transaction information from the client device for transmission through a network to a financial institution of the client device to ensure payment, and the transaction information includes an amount of money to be paid. The financial institution communication module is configured to request payment through the network from the financial institution of the client device upon successful completion of the financial transaction. The financial institution communication module is further configured to query the financial institution of the client device for validity information as to the validity of the client device and to receive the validity information. The processor is configured to approve the financial transaction if the authentication data received from the client device confirms the identity of the user of the client device and the validity information received from the financial institution of the client device confirms the validity of the device.

The methods may comprise a further step of entering the new actuation sequence multiple times to ensure correctness.

The methods may comprise a further step of the smartcard no longer recognizing a previous actuation sequence stored on the secure element of the smartcard as correct.

The step of depressing a button to allow the physical movement to be entered may take place before the smartcard interfaces with the point of sale terminal.

The step of depressing a button to allow the physical movement to be entered may take place after the smartcard interfaces with the point of sale terminal.

Energy may be harvested over NFC or though insertion of the smartcard from the POS terminal to power the smartcard.

All matching may be done locally on the smartcard card and no actuation sequence information may be transmitted to the point of sale terminal.

Matching may be at least partially done on the point of sale terminal and some actuation sequence information may be transmitted to the point of sale terminal.

The actuation sequence may occur before the smartcard is brought into close proximity of the point of sale terminal.

The actuation sequence may occur immediately after the smartcard is brought into close proximity of the point of sale terminal.

Each successful actuation sequence may allow only one financial transaction to be completed with the smartcard.

Each successful actuation sequence may allow an unlimited number of financial transactions to be completed with the smartcard within a timeframe previously agreed upon by the user, the financial institution, or both.

The point of sale terminal may be configured to print a physical receipt with the payment details upon successful completion of the financial transaction.

The methods may comprise a further step of the point of sale terminal querying the financial institution of the smartcard as to the sufficiency of funds in one or more accounts of the user.

The methods may comprise a further step of the point of sale terminal proceeding with the financial transaction only if the sufficiency of funds in the one or more accounts of the user is confirmed.

The smartcard may have a fingerprint reader and may use a secure enclave method to confirm the user's fingerprint matches the owner's fingerprint.

Biometric information of users may be identified using spatial correlations in phase-space, the phase-space representation of a signal being constructed in real-time by delaying the signal by three distinct amounts to create three axes of the phase-space.

The biometric information of users may comprise a heart rhythm or cardiac waveform of the user, and the signal may comprise heart rhythm or cardiac waveform information of the user.

The actuation sequence may include biometric information of a user collected by a biometric sensor.

The actuation sequence may be stored on the smartcard. An encoded version of the actuation may be stored. The actuation sequence may be used to generate an algorithm that is stored on the card. The algorithm may respond to the actuation sequence and determine whether or not the actuation sequence has been successfully entered. Encoding the actuation sequence as an algorithm has the advantage that the actual actuation sequence is not stored in a readable form on the card, for additional security.

Harvested energy may be stored at a short-term power storage element of the smartcard.

The short-term power storage element may be a supercapacitor.

The short-term power storage element may be able to be charged or activated by power from a powering coil on a mobile phone or in a powering coil installed near the POS terminal.

The short-term power storage element may be able to provide power to the entire client device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
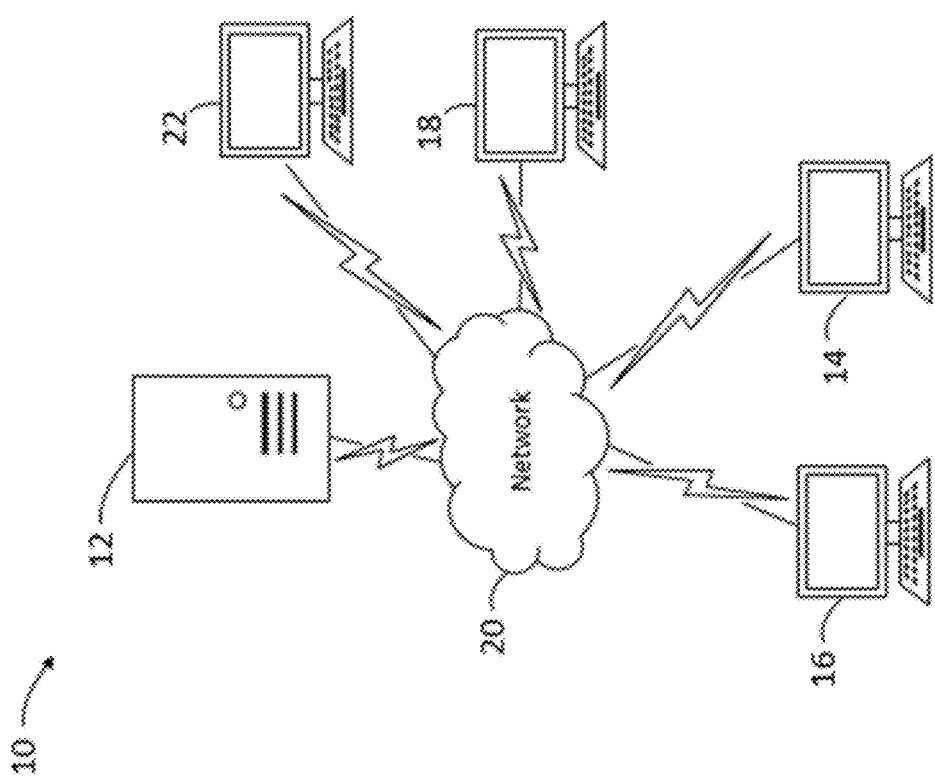
FIG. 1 is a schematic diagram of a system for increasing security when using a smartcard.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods, and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Embodiments described herein provide a system and method for identification of a person trying to use a debit or credit smartcard for a financial transaction. NFC cards are especially vulnerable to several kinds of attacks and thefts that are hard to detect. For example, information from the cards can be harvested from a user's pocket should a thief get close enough with the correct type of RFID reader. Identification of the card holder is an important step missing in the smartcard industry. The use of a personalized PIN provides a first step, but entering the number in public spaces is fraught with security issues.

Embodiments provided herein provide a second level of security when used in conjunction with PIN entry called the actuation sequence. There are many embodiments for how the user achieves the actuation sequence that involve 'something they know' and 'something they are' security methods. This second authorization would be a two-factor authentication process. In an embodiment, both factors include something known to the user. In an embodiment, the new security level includes a second authentication that involves something that the user is. This intrinsic security level is unique and would create an extremely powerful security level.

All embodiments illustrated and discussed below involve actuation sequences that are connected only between the smartcard and the user possessing the smartcard. In an embodiment there is also a supporting biometric device that supports the user's actuation sequence to the smartcard. There is no direct exchange of information between the POS terminal and the smartcard, as is the case with entering a PIN value. The POS terminal may be a separate but connected combination of a vendor terminal and a Secure Pin Entry Device (SPED). The POS terminal may be an integrated terminal with functions of both POS and SPED. This unique bypassing of the POS terminal may mean that harvesting security information like the PIN may not be possible. The user establishes their actuation sequence at their authorized bank or bank ATM where they might also input a PIN for their smartcard.

Smartcards have the advantage of containing small microprocessors, a security element, and memory chips on them to perform a range of functions. Smartcards can be passive or powered, which extends the embodiments described below in various ways. When discussing both passive and powered cards the term 'smartcards' will refer to both types of cards. The choice between performing a physical PIN entry at the POS terminal and performing a TAP transaction is often dictated by the transaction value and the POS terminal capabilities. For the embodiments below, it does not matter what type of transaction is performed, as the step of enabling the card has advantages for both methods of payment.

Some embodiments herein discussed contemplate smartcards with batteries or energy storage methods; these will be referred to as "powered smartcards". Original smartcards with no power storage methods will be termed "passive smartcards". For example, when using a passive smartcard for an NFC or PIN transaction, an exchange of energy is achieved through electromagnetic induction with an enabled POS terminal. Once the smartcard touches the POS terminal or both are brought within close proximity of each other, energy is provided to the smartcard from the point of sale (POS) terminal. In some other embodiments, energy can be supplied through electrical contacts on the card. Once enough charge is exchanged, the chip on the passive smartcard may exchange the necessary information to complete the financial transaction. This energy can also be used to turn on an LED indicator light when successful authorization has been achieved. However, discussed below are several other embodiments that may use this energy in unique ways to further enhance security for all financial transactions.

With the advent of new powered smartcards, like the Tim Horton's and VISA double-double card, further embodiments exist for better security when performing PIN and TAP transactions. These powered smartcards may allow for even greater security options as user identification can be performed before the smartcard reaches the POS terminal.

In an embodiment, the actuation sequence might only be necessary for transaction amounts over a certain limit. For example, for a PIN transaction the limit may be 500 or 1000 dollars; for a TAP transaction, the limit may be 100 dollars. In the case of the passive smartcard, this step would be performed only after the passive smartcard has touched the POS terminal and received some power. In the case of the powered smartcard, this step could be performed beforehand, perhaps while the customer waits in line, and the actuation sequence could be enabled for a defined length of time, for example some number of minutes. This length of time can be implemented by using a timer-counter of a software counting loop on the smartcard's processor.

To avoid accidentally activating the actuation sequence and draining the battery on the powered smartcard, an additional recessed button could be present to enable the actuation sequence to start. This would reduce accidental enabling of the card while in a wallet.

Once the actuation sequence is entered, there are several approaches to indicate success or failure of the entered sequence. In an embodiment, the POS terminal signals success by displaying a message that the transaction is being processed. This message may be similar to what many smartcard users see today on the POS terminal display screen when they TAP their smartcard or enter a PIN. In an embodiment, energy may be harvested over NFC or though insertion of the smartcard to illuminate an LED light when the actuation sequence is successful. With the light illuminated, a traditional TAP or PIN transaction can be performed, whereas if the light is not illuminated, the card will do nothing. In a further embodiment, there is a light to indicate failure to achieve proper identification. This extra step of enabling the card prior to use would also make it impossible for an RFID reader to pull information from the smartcard when still in the consumer's pocket.

There are many embodiments for the actuation sequence, several of which are listed below. In an embodiment, the smartcard has an active section with some number of hidden or visible buttons or small pads. The buttons may also employ a level of tactile feedback to facilitate use while hidden from view, for example by using keyboard switches with snap domes. Depending on the size of the active section, there may be four, six, eight or more buttons or sensitive pads. The user may simply drag a finger across the active section, following a pattern and hitting the correct number of sensitive pads to authorize the transaction.

In an embodiment, the entire pad may be touch-sensitive and the user may draw out a pattern on the pad. The user may trace out a letter in the alphabet or enter a particular tap sequence on the pad. In an embodiment, while using a passive or powered card, the user may perform a series of finger taps against a touch sensitive pad located on the smartcard itself. The finger may be a finger or a thumb, and the taps may be composed of short and long taps performed directly upon the touch sensitive pad on the card itself. This embodiment has the advantage of allowing the user of a powered smartcard to perform these steps while waiting in line before reaching the POS terminal itself. This embodiment also allows the user with a powered smartcard to perform the activation actions very privately. For example, a user might be able to leave the smartcard in their pocket to perform the taps. The actuation sequence may take place through a series of taps performed each time the smartcard touches a contactless-enabled POS terminal.

A certain number of failures to guess the correct tap sequence may result in the card going dormant for a period of time, for example a day. The consumer can determine in advance how many failures would be allowed, e.g., 4, 8, or 10 failures. If the user is performing the taps in their pocket, it would be expected that some number of failures would occur. In an embodiment a light would illuminate, or a tone may be sounded when the card was authorized for use. This would indicate to the consumer that they did not have to perform the tap sequence again and that the card is ready for user for the next several minutes (according to a predetermined time selection). In an embodiment, a powered smartcard might also have an enable button to signal the user's desire to start the tapping sequence. Such a feature helps ensure that pressure applied to the touch sensitive pad while the smartcard remains in a purse or wallet would not drain the battery and cause accidental tap sequence failures.

In an embodiment, a user wishing to perform a contactless transaction may perform a series of mechanical TAPs against the POS terminal to identify themselves as the person that owns the smartcard being used. Such an operation is possible whether the smart card is a powered smartcard or a passive smartcard, as the operation could still be easily identified at the POS terminal. In this embodiment, the card holder has established with their bank a TAP sequence from a wide number of choices. The TAP sequences could be long, short, or a combination of long and short TAPs combined. Each TAP would cause an energy pulse into the smartcard, and the duration between the TAPs would create different energy surge levels and lengths. When the correct TAPs are entered, the smartcard may have a light that illuminates. When the correct TAPs are entered, the POS terminal may signal that information has been received and the transaction is being processed. The TAPs may be measured by a change in electromagnetic field in a waving action near a magnet or electromagnetic field, a microphone measuring the sound of the taps, or a piezoelectric element.

In an embodiment, a passive or powered smartcard might have one or two depressible size pads on one side or edge or two sides or edges of the smartcard. The user may place a finger, thumb, or a finger and a thumb on opposite sides of the smartcard to allow a heart rhythm to be detected. A heart rhythm or cardiac waveform is unique to every person and so can be recorded and compared very quickly with a signature heart rhythm stored on the smartcard. Such a heart rhythm or cardiac waveform is considered a reliable indication of identity. Some variance is expected in some waveform characteristics, for example a heart rate may go up if a user is distressed. Algorithmic compensations may be used to calculate whether the user is or is not the authorized user of the smartcard. This algorithm may account for changes in waveform due to situational variants to advantageously avoid false negatives. Once this signature rhythm is matched, the smartcard will be authorized for use. In an embodiment, a light may illuminate; in an embodiment, the POS terminal simply tells the user the transaction is proceeding. In an embodiment, the user of the smartcard wears one or more biometric sensors. Any such sensors collect unique identifying information from the user, which includes but is not limited to the user's heart rhythm and brain waves. The actuation sequence then includes requiring the user to touch the smartcard to the biometric sensor to receive over NFC the information about the user's biometric status, for example heart rhythm, iris pattern, and brain waves. The smartcard then performs a comparison to information saved on the smartcard to confirm a match to the owner of the smartcard before allowing the financial transaction.

In an embodiment, the smartcard is first coupled to a secondary device such as a smartphone. The smartphone can collect biometric information validating the user. This validation on the smartphone may be in the form of a fingerprint sensor, an iris scan, facial recognition, sub-dermal identifier, and/or biometrics measured on a connected smartwatch or other identification. The confirmed validation on the smartphone can then be relayed to the smartcard to facilitate the activation. Such relaying is preferably done by transmitting an encoded version of the validation information via RFID to the smartcard. The smartcard can further validate the encoded version of the validation information. If the validation information is confirmed, the smartcard can be enabled to perform a financial transaction. In an embodiment, the smartcard has two independent RFID systems to allow simultaneous communication between the smartcard and smartphone and between the smartcard and POS terminal.

In an embodiment, the user of the smartcard has a sub-dermal identification chip embedded under their own skin. The sub-dermal chip gets its power from the smartcard itself when brought into close proximity to a smartcard. If the smartcard is a powered smartcard, then sub-dermal identification could happen at any time before or during the POS transaction. If the smartcard is a passive smartcard, then energy is transferred from the smartcard to the sub-dermal identification chip only after the passive smartcard itself is powered up from the POS terminal. The sub-dermal chip contains unique identification information or a secure algorithm such as a MAC algorithm known by the user's bank. An earlier step of sharing this unique identification through a registered Bank ATM and placing it on the card is done by the user before proceeding to authentication.

In an embodiment, the smartcard has a fingerprint reader and uses a secure enclave method to confirm the fingerprint matches the owner's fingerprint.

In an embodiment, the smartcard has a small camera and can perform facial recognition or an iris scan to confirm the cardholder is the rightful owner of the smartcard. Using a method like the secure enclave method, a copy of the fingerprint, face, or iris does not have to be kept on the smartcard. Instead, an algorithm is created using key attributes of the information to allow for a match or no-match comparison once data is provided to the newly created algorithm.

As already mentioned, the correct actuation sequence will have been selected and known by the owner of the smartcard. The user will have visited a bank or ATM machine owned by their bank to initially set the actuation sequence. The actuation sequence was then stored on the smartcard on the chip much as a PIN is remembered and changeable by a typical consumer. As mentioned In an embodiment incorporating biometric information of the user, an algorithm of the gathered biometric information is created to allow for a match, no-match actuation sequence.

In an embodiment, when using a powered smartcard, it is possible to harvest some energy from the POS terminal or other charging system each time a TAP is performed. Advantageously, such energy may then be routed back into a rechargeable Lithium-ion battery to compensate for any additional energy costs of the new security step. These mini-harvesting events may create a trickle charge to extend the use of the powered card and the battery.

FIG. 1 shows a block diagram illustrating a system 10, in accordance with an embodiment.

The system 10 includes a server platform 12 which communicates with a plurality of smart debit or credit devices 14, a plurality of POS terminals 16, and a plurality of administrator devices 18 via a network 20. The server platform 12 also communicates with a plurality of authorizing computers 22. The server platform 12 may be a purpose built machine designed specifically for increasing security when using a smart debit or credit device in a financial transaction. The authorizing computer 22 may be an ATM or other bank machine. The authorizing computer 22 may be a special purpose bank computer designed for updating the security settings of a smartcard.

The server platform 12, POS terminals 16, administrator devices 18 and authorizing computers 22 may be a server computer, desktop computer, notebook computer, tablet, PDA, smartphone, or another computing device. The devices 12, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20. Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

In the description that follows, devices such as server platform 12, smart debit or credit devices 14, POS terminals 16, administrator devices 18, and authorizing computers 22 are described performing certain acts. It will be appreciated that any one or more of these devices may perform an act automatically or in response to an interaction by a user of that device. That is, the user of the device may manipulate one or more input devices (e.g., a touchscreen, a mouse, a button) causing the device to perform the described act. In many cases, this aspect may not be described below, but it will be understood.

As an example, it is described below that the devices 12, 14, 16, 18, 22 may send information to the server platform 12. For example, a smartcard user using the smart debit or credit device 14 may manipulate one or more input devices (e.g. a mouse and a keyboard) to interact with a user interface displayed on a display of the smart debit or credit device 14. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of smart debit or credit devices 14, POS terminals 16, administrator devices 18, and authorizing computers 22. Generally, the information may comprise at least an identifier identifying the smart debit or credit device, POS, administrator, or user. For example, the information may comprise one or more of a username, e-mail address, password, or social media handle.

In response to receiving information, the server platform 12 may store the information in storage database. The storage may correspond with secondary storage of the device 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The smart debit or credit device 14 may be associated with a smart debit or credit account. Similarly, the POS terminal 16 may be associated with a POS account, the administrator device 18 may be associated with an administrator account, and the authorizing computers 22 may be associated with a user account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

Figure 2:
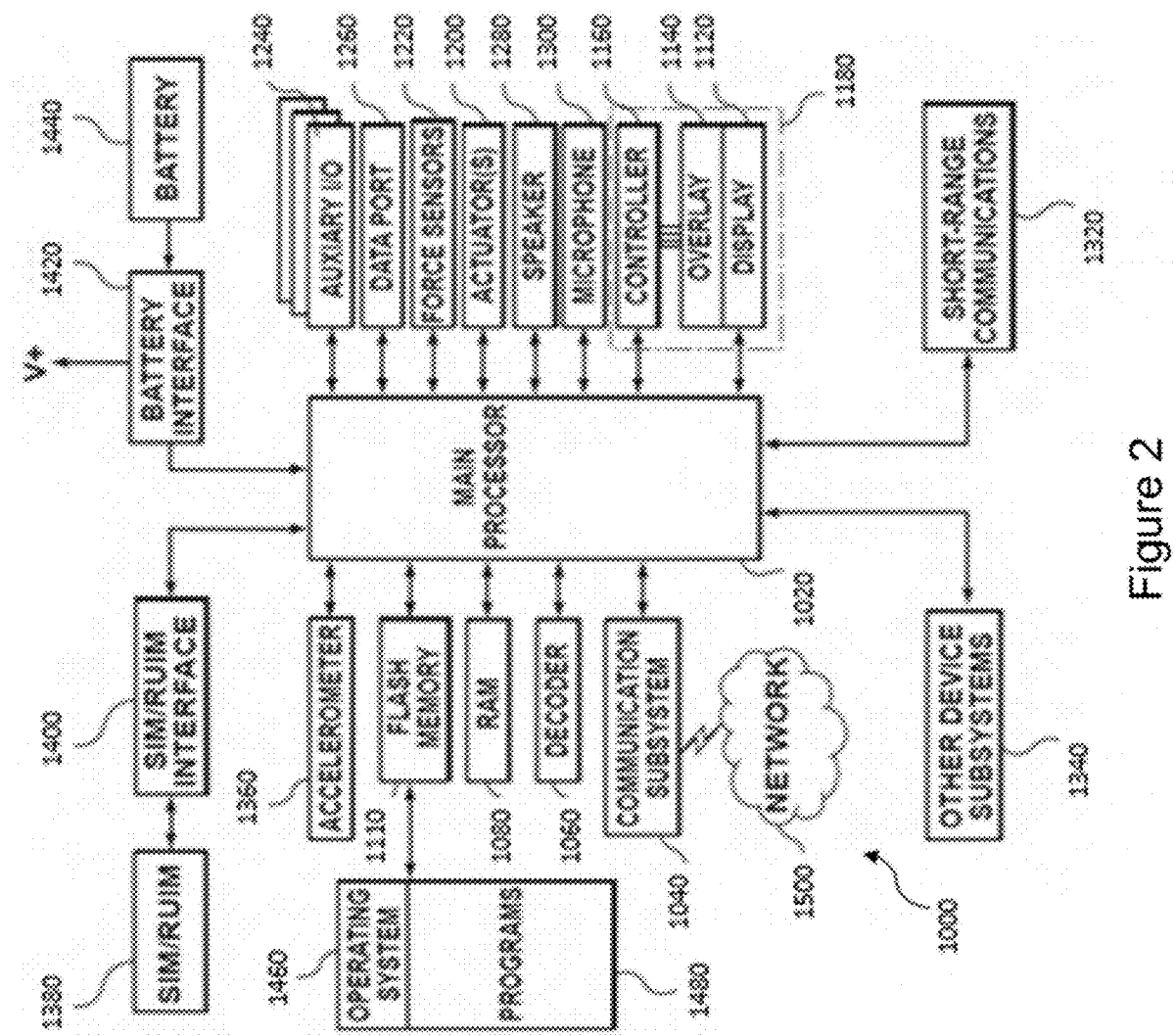
FIG. 2 is a block diagram of a computing device of FIG. 1.

FIG. 2 shows a simplified block diagram of components of a mobile device or portable electronic device 1000.

The portable electronic device 1000 includes multiple components such as a processor 1020 that controls the operations of the portable electronic device 1000. Communication functions, including data communications, voice communications, or both may be performed through a communication subsystem 1040. Data received by the portable electronic device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The portable electronic device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In an embodiment, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 1020 may be displayed on the touch-sensitive display 1180.

The processor 1020 may also interact with an accelerometer 1360 as shown in FIG. 2. The accelerometer 1360 may be utilized for detecting direction of gravitational forces or gravity-induced reaction forces.

To identify a subscriber for network access according to the present embodiment, the portable electronic device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The portable electronic device 1000 also includes an operating system 1460 and software programs 1480 that are executed by the processor 1020 and which may be stored in a persistent data storage device such as the flash memory 1110. Additional applications may be loaded onto the portable electronic device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 3:
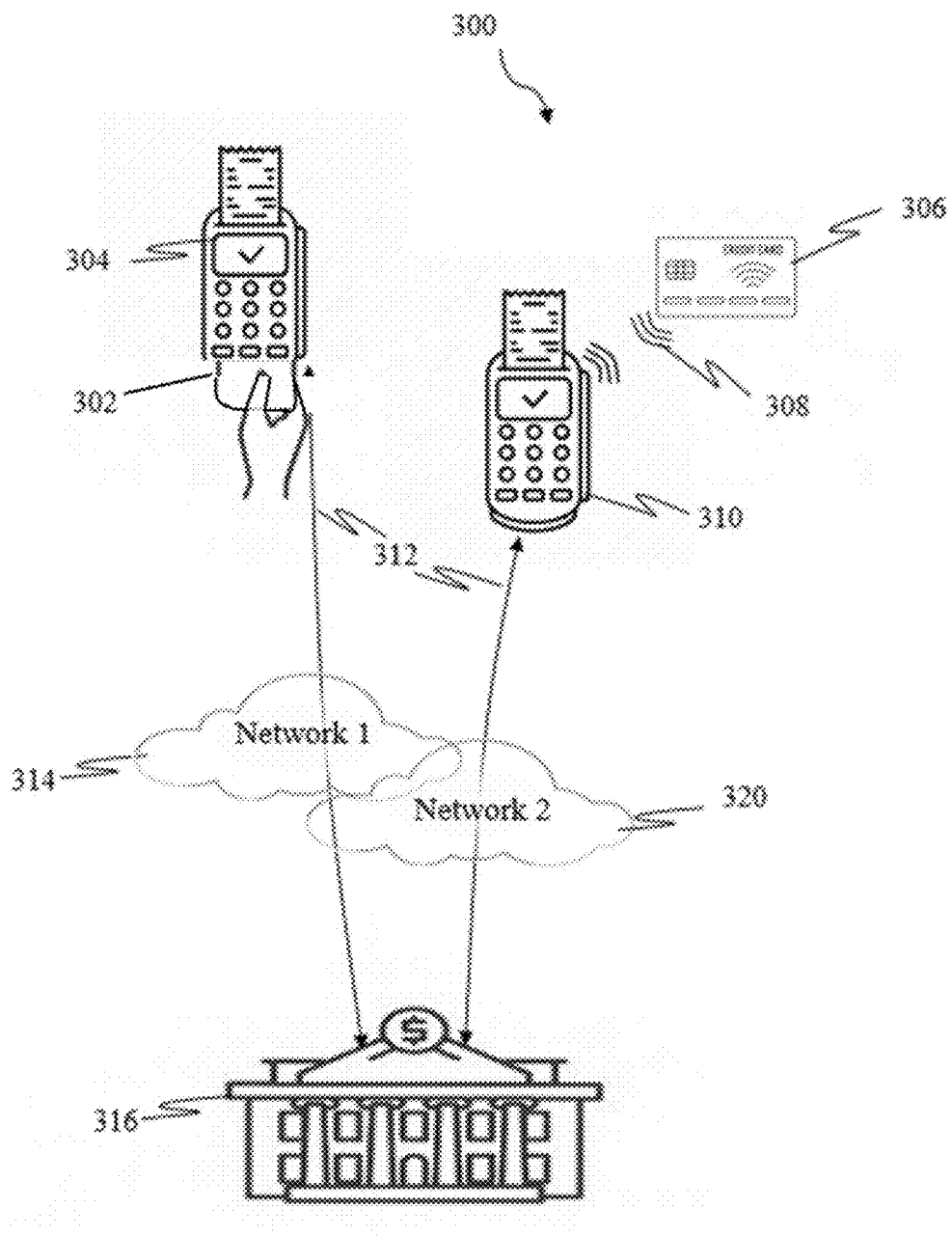
FIG. 3 illustrates an embodiment of a system for increasing security when using a smartcard in a financial transaction.

Turning now to FIG. 3 there is provided a system 300 for increasing security when using a smartcard in a financial transaction.

Two types of smartcard actions 302, 306 are illustrated. The user of the first smartcard 302 inserts the smartcard 302 into the point of sale (POS) terminal 304 in order to engage with the terminal 304. Insertion of the smartcard 302 into the terminal 304 may be advantageous due to the size of the transaction, or because the terminal 304 is only capable of smartcard insertion. Such a preference for the older method may be entirely idiosyncratic on the part of the user. The user of the second smartcard 306 may use near field communications (NFC) to engage in communication 308 with the POS terminal 310. Such communication advantageously avoids any physical contact between the smartcard 306 and the terminal 310 as well as between the user 306 and the terminal 310. The smartcards 302 and 306 are recognized by the terminals 304 and 310, respectively. In the case of smartcard 306 using NFC to engage in communication 308 with the POS terminal 310, the smartcard 306 advantageously passes any initial security levels through communication 308. An exchange using a POS terminal connection 312 through one or more networks 314, 320 takes place to reach a financial institution 316 that is indicated by the smartcard number. The financial institution 316 is the financial institution that has issued the smartcards 302, 306.

The smartcard 302 may be a powered smartcard. Such a powered smartcard has an internal power source at power unit 940 of FIG. 9. Such power unit 940 may further contain a battery 942.

The smartcard 302 may be a passive smartcard. While a passive smartcard may have a power unit 940 for absorbing energy harvested at or near a POS terminal 304, the passive smartcard does not have a battery 942. The smartcard 302 may harvest energy from the POS terminal 1900 or other charging system each time a tap is performed. The harvested energy may be stored at a short-term power storage element 960 of the smartcard 302.

In FIG. 3, the one or more networks 314, 320 are public networks such as the Internet. The one or more networks 314, 320 may include merchant acquirer networks or a specialized financial network, such as the ones offered by Visa and Mastercard credit card network. The one or more networks 314, 320 may further include a specialized financial network such as the Interac Network in Canada for debit card transactions.

In FIG. 3, the performing of financial transactions with smartcard 306 is done using a contactless or NFC method of data exchange. Also in FIG. 3, the performing of financial transactions with smartcard 302 is done using an insertion or contact method of data exchange. A preferred example of the insertion method connects electrical contacts on the smartcard to an authorization device or point of sale terminal as is detailed in the "EMV Integrated Circuit Card Specifications for Payment Systems Version 4.3 by EMVco" and in ISO/IEC 14443 and ISO/IEC 7810. For both insertion of the smartcard 302 and NFC contactless transactions with the smartcard 306, an exchange of information takes place between the smartcard 302, 306 at input module 906 of FIG. 9 and the POS terminal 304, 310 at input module 1906 of FIG. 10. For insertion of the smartcard 302, the user of the smartcard 302 uses the POS terminal's keypad to enter a PIN for verification at PIN Input 1022. Once inserted, the smartcard 302 draws power at power unit 940 to enable the processor 904 and access to memory 902 to take place for PIN verification. Insertion of the smartcard 302 advantageously provides additional security through the PIN verification through checking module 932 comparing PIN input 922 with PIN storage 912. For the contactless transaction with smartcard 306, there is no PIN verification, and power is drawn using electromagnetic methods at the terminal 1900 to the power unit 940. The power drawn from touching (placing the smartcard in the RFID powering field of the POS terminal) 1900 is then used to power up the processor 904 and any other memory 902 that is needed. Such powering up may provide a longer effective use period for a smartcard. The contactless transaction with smartcard 306 is often more convenient for the user because the contactless transaction with smartcard 306 takes less time to complete than the insertion of the smartcard 302 and allows the user to maintain a greater physical distance from the POS terminal.

For both smartcards 302 and 306, other transaction details including a transaction number, a vendor ID, and the size of the transaction are also provided to the smartcard 302, 306 for encoding at additional memory 918. Once the transaction details are encoded, the smartcard 302, 306 uses the POS terminal connection 312 to communicate through one or more networks 314, 320 to send the encoded transaction details to the financial institution 316. The financial institution 316 may be a bank or credit agency. The addition of another level of security advantageously does not change or disrupt the exchange of information, including the transaction details, or the format of the information, including the transaction details.

In an embodiment, there is a system of computers for increasing security in a financial transaction. The system of computers contains a smartcard 302 for payment in a financial transaction. The smartcard 302 has a memory 902 for storing a first actuation sequence for confirming a user's identity. The smartcard 302 has a checking module 932 that authorizes the transaction only when a second actuation sequence is identical to the first actuation sequence. The first actuation sequence is stored in the memory 902.

The system of computers further contains a point of sale terminal 304 for recording payment details from the smartcard 302 once the financial transaction is authorized. The point of sale terminal 304 further transmits a request for payment through a network to a financial institution according to the payment details.

The system of computers further contains a financial institution authorizing computer 2600 of a financial institution 316 for allowing recording of an actuation sequence. The recording of an actuation sequence occurs on the smartcard 302 at memory 902. The financial institution authorizing computer 2600 makes payment to the owner of the point of sale terminal 304 once the transaction is authorized, according to the payment details.

In an embodiment, there is a system of computers for increasing security in a financial transaction when using a smartcard. The system of computers includes a smartcard 302 for payment in a financial transaction. The smartcard 302 has a memory 902 for storing an actuation sequence for confirming a user's identity.

The smartcard 302 further has a checking module 932 that authorizes the transaction only when a second actuation sequence is identical to a first actuation sequence stored in the memory 902.

The system of computers further contains a financial institution authorizing computer 2600 of a financial institution 316. The financial institution authorizing computer 2600 allows recording of an actuation sequence on the smartcard 302 at memory 902. The financial institution authorizing computer 2600 further makes payment once the transaction is authorized, according to payment details.

In an embodiment, there is a system of computers for increasing security in a financial transaction. The system of computers contains a point of sale terminal 1900. The point of sale terminal 1900 records payment details from a user once the financial transaction is authorized.

Authorization of the financial transaction is according to information provided by the user to confirm the user's identity and transmit a request for payment through a network 314, 320 to a financial institution 316 according to the payment details.

The system of computers further contains a financial institution authorizing computer 2600 of the financial institution 316. The financial institution authorizing computer 2600 allows recording of an actuation sequence associated with the user. The financial institution authorizing computer 2600 further makes payment to the owner of the point of sale terminal 1900 once the transaction is authorized, according to the payment details.

Figure 4:
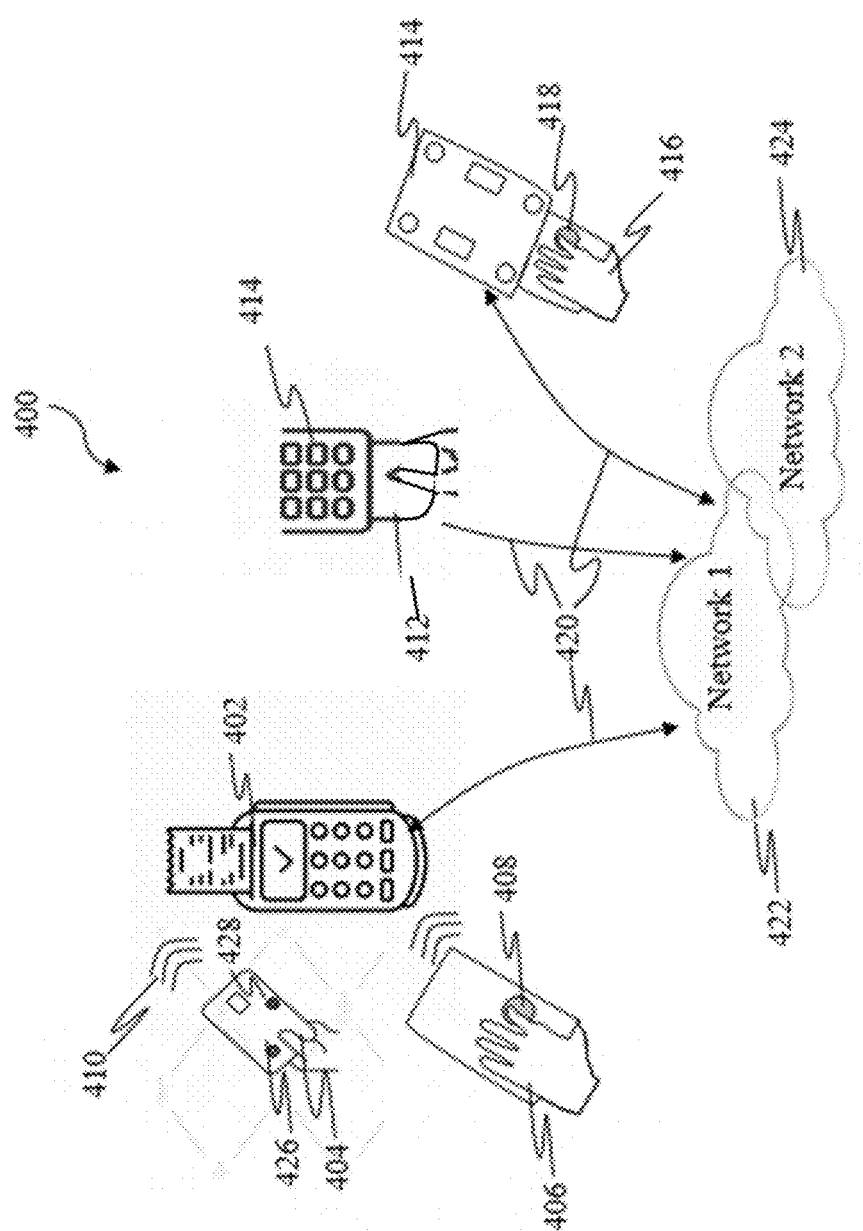
FIG. 4 illustrates an embodiment of a system for increasing security when using a smartcard with a POS terminal.

Turning now to FIG. 4, there is provided a system 400 for increasing security when using a smartcard with a POS terminal.

The user of the smartcard 404 performs a contactless TAP 410 transaction with the POS terminal 402. On the backside 406 of the smartcard 404 is a touch sensitive pad 408 where the user places a finger. The finger placed may be a thumb, index finger, or any other finger on either hand. Before the TAP transaction 410 can take place, the user taps with the finger on the touch sensitive pad 408. A tap sequence produced at the touch sensitive pad 408 is received at the touchpad input 926 of the input module 906 of FIG. 9. The tap sequence produced by user contact with the touch sensitive pad 408 is matched by checking module 932 with an earlier tap sequence stored in the pattern storage 916 of the memory 902 if the sequences are identical. The earlier tap sequence has been entered at the user's bank or authorized ATM center for storage on the smartcard 404.

The smartcard 404 may be a powered smartcard. Such a powered smartcard has an internal power source at power unit 940 of FIG. 9. Such power unit 940 may further contain a battery 942.

The smartcard 404 may be a passive smartcard. While a passive smartcard may have a power unit 940 for absorbing energy harvested at or near a POS terminal 402, the passive smartcard does not have a battery 942.

The touch sensitive pad 408 may have a large area relative to the size of the smartcard 404. Instead of tapping the touch sensitive pad 408, the user may draw a pattern or perform a gesture on the touch sensitive pad 408 to perform the necessary identification. A more detailed pattern may be possible to enhance security where the touch sensitive pad 408 has a large area relative to the size of the smartcard 404. The actuation sequence occurs by the user tracing out a pattern on a touch-enabled part of the smartcard 404. Such a pattern is received at touchpad input 926 as previously described. An advantage of the system of FIG. 4 is that the touch sensitive pad 408 is on the back of the smartcard 406 and is advantageously hidden from an outside observer. The smartcard 404 may only authorize the transaction. The user of the smartcard 404 user may perform both an actuation sequence and a PIN entry to authorize the financial transaction. When the transaction is so authorized, the smartcard 404 exchanges data with the POS terminal 402 through the POS communication module 950. The transaction may only be authorized if the tap sequence entered through input module 906 matches the earlier tap sequence stored at the memory 902. The earlier tap sequence was entered at the user's bank or authorized ATM center for storage on the smartcard 404.

In FIG. 4, the smartcard 404 has a light 426. When the tap sequence entered matches the earlier tap sequence according to the checking module 932, the light 426 illuminates.

The smartcard 404 may be a passive smartcard. A passive smartcard does not have an internal power source such as a battery 942. The smartcard 404 can advantageously draw power from the POS terminal 402 through the power unit 940 when the smartcard 404 is brought within close proximity of the terminal 402. This power may be used to power elements of the passive smartcard, such as the memory 902, the processor 904, or the light activator 930 to activate the light 426. The passive smartcard advantageously does not need a minimum power level of the smartcard.

Where smartcard 404 is a powered smartcard, smartcard 404 may also advantageously draw power from the POS terminal 402 through the power unit 940 when the smartcard 404 is brought within close proximity of the terminal 402. This power may be used to power elements of the powered smartcard, such as the memory 902, the processor 904, or the light activator 930 to activate the light 426.

On the smartcard 404, an enable button 428 is present. Only when the enable button 428 is depressed is the touch sensitive pad 408 enabled for identity verification and transaction authorization. The enable button 428 advantageously ensures that, when the smartcard 404 is in the user's wallet, the touch sensitive pad 408 is not accidentally be depressed by the user and draw power needlessly. More generally, only when the enable button 428 is depressed can the actuation sequence be performed.

When an actuation sequence is entered, it is received at the input module 906. The actuation sequence received at the input 906 is compared with the appropriate sequence stored in biometrics storage 914, pattern storage 916, or additional memory 918 according to the configuration of the smartcard 404. The comparison between the actuation sequence at input module 906 and memory 902 is performed by checking module 932 at the processor 904. If the correct tap sequence is entered, the POS communication module 950 from the smartcard 404 to the POS terminal 402 is engaged, and a communication 420 to a financial network 422, 424 can take place.

The user may further be prompted to enter a PIN value into another POS terminal 414. This PIN value entry may advantageously provide further security to the owner of the smartcard 404, 412. The user inserts the smartcard 412 into the terminal 414 to begin the process. On the backside 416 of the smartcard 412 is a touch sensitive pad 418 onto which the user places a finger. The finger placed may be a thumb, index finger, or any other finger on either hand. The smartcard 412 has internal schematics similar to those of smartcard 402, and so references to FIGS. 9 and 10 will not be repeated.

With the smartcard 412 inserted into the POS terminal 414, the smartcard 412 can begin to draw power to enable the CPU 1020 and memory chips 1110 of the smartcard 412 to activate. With the CPU 1020 activated, the smartcard 412 will not exchange data with the POS terminal 414 until the correct sequence has been entered.

The touch sensitive pad 418 may have a large area relative to the size of the smartcard 412. Instead of tapping, the user draws a pattern on the touch sensitive area 418 to perform the necessary identification. An advantage of the system of FIG. 4 is that the touch sensitive pad 418 is on the back of the smartcard 416 and is advantageously hidden from an outside observer. Once the correct tap sequence is entered, the necessary data is exchanged between the smartcard 412 and the POS terminal 414. The POS terminal then uses this data to initiate a communication 420 through one or more networks 422, 424 to a financial institution (not shown) to validate the transaction. In FIG. 4, the smartcard 404 has a light 426 to indicate success when the correct tap sequence is entered through the touch sensitive pad 408.

When the smartcard 404 is a powered smartcard, it is possible to pre-enter the tap sequence through input module 906 before inserting the smartcard 404 into the POS terminal 402.

The smartcard 404 has an enable button 428 to power the touch sensitive pad 408. The enable button 428 advantageously avoids accidental touching of the touch sensitive pad 418 when in a wallet or purse.

In an embodiment, there is a system of computers for increasing security in a financial transaction when using a smartcard. The system of computers contains a smartcard 404 for payment in a financial transaction. The smartcard 404 has a memory 902 for storing a first actuation sequence when confirming a user's identity.

The smartcard 404 contains a checking module 932 that authorizes the transaction only when a second actuation sequence is identical to a first actuation sequence stored in the memory.

The system of computers further contains a point of sale terminal 1900 for recording payment details from the smartcard 404. The payment details are recorded once the financial transaction is authorized. The point of sale terminal 1900 transmits a request for payment.

Figure 5:
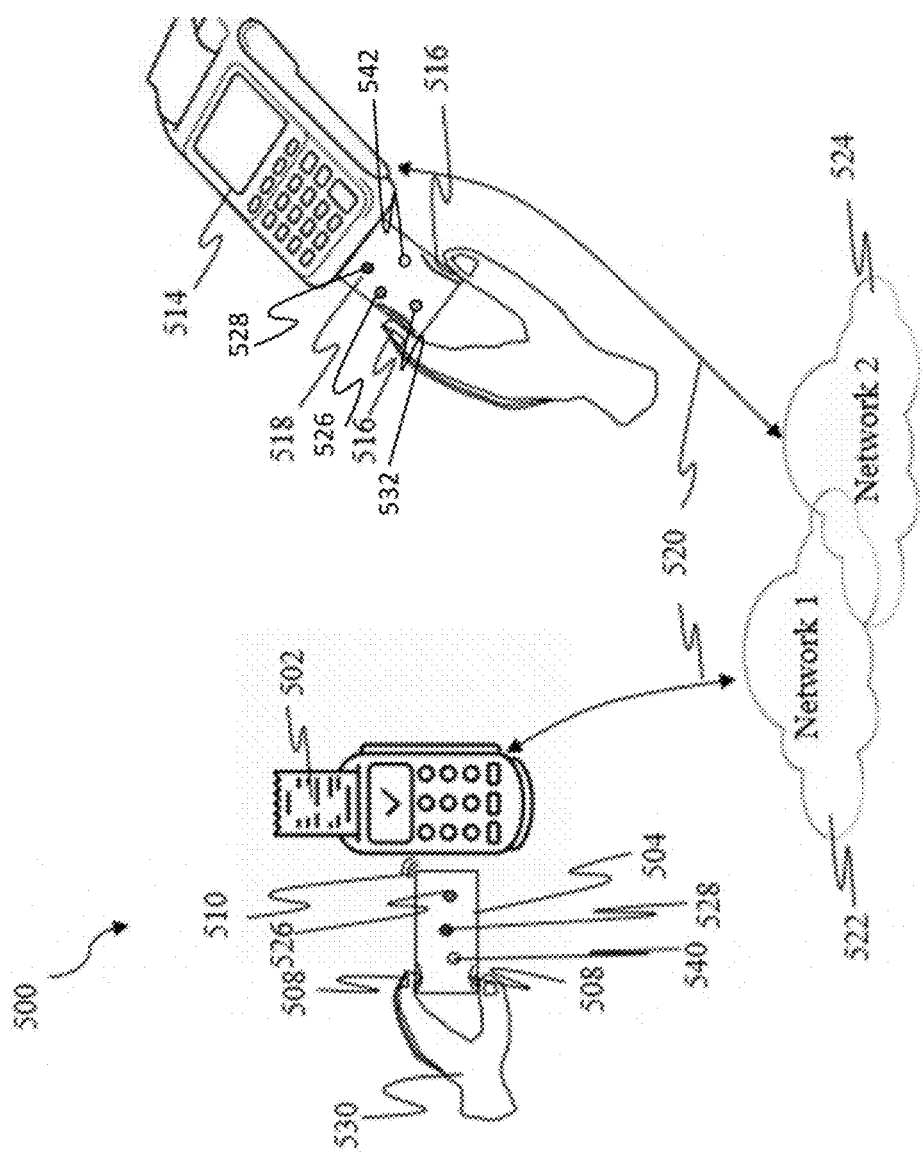
FIG. 5 illustrates an embodiment of a system for increasing security when using a smartcard with a POS terminal.

Turning to FIG. 5, there is provided an illustration of a system 500 for increasing security when using a smartcard with a POS terminal.

The smartcard 508, 518 may be a powered smartcard. Such a powered smartcard has an internal power source at power unit 940 of FIG. 9. Such power unit 940 may further contain a battery 942.

The smartcard 508, 518 may be a passive smartcard. While a passive smartcard may have a power unit 940 for absorbing energy harvested at or near a POS terminal 502, the passive smartcard will not have a battery 942.

In this system, the user makes contact with two pressure sensitive circuits 508 on the smartcard 504. These pressure sensitive circuits 508 may advantageously be located on the edge of the smartcard 504, on either side, in the middle, or in any place that allows a user to hold the smartcard 504 in a stable position.

As the user holds the two pressure sensitive circuits 508, a heart rhythm or cardiac waveform is detected through Sensor Input 924 of Input Module 906. The rhythm is matched against a saved heart rhythm or cardiac waveform at biometrics storage 914 of memory 902 that has been previously saved to the smartcard 504 by the user. The matching is performed by the checking module 932 of the processor 904.

As the user holds the two pressure sensitive circuits 508, elements of the heart rhythm or cardiac waveform are collected and fed into a heart rhythm or cardiac waveform algorithm performing a secure enclave method of binary match, no-match comparison on the smartcard 504 at the checking module 932. This heart beat information is something intrinsic to the user and is advantageously virtually impossible to steal or duplicate, as every person's heart rhythm or cardiac waveform is unique. The use of heart beat information as a means of identity verification advantageously renders the smartcard 504 highly secure. Only when the correct heart rhythm or cardiac waveform is detected according to biometrics storage 914 via checking module 932 does the smartcard 504 enable communications 510 to the POS terminal 502.

The actuation sequence may occur when the smartcard 504 is brought into close proximity to an ECG bio-sensor measuring the user's heart rhythm or cardiac waveform at sensor input 924. The actuation sequence may occur when the smartcard 504 is brought into close proximity to an EEG bio-sensor measuring brain wave patterns at sensor input 924. The actuation sequence may occur when one or more actuation sequences are combined to activate the smartcard 504.

When using a powered smartcard, the user may advantageously pre-enable the smartcard 504 before bringing it in proximity to the POS terminal 502. Such pre-enabling may save the user time and increase the convenience of the transaction. In FIG. 5, an enable button 528 is present to turn on the pressure sensitive circuits 508 when button input 928 receives input. Such a feature advantageously helps ensure that unintentional or unexpected pressure on the circuits 508 is not detected and does not drain the battery.

For a passive smartcard, power may be harvested from the POS terminal 502 at power unit 1940 to power unit 940 as needed when the passive smartcard is in range. Power may also be drawn when the client device 900 is a powered smartcard. In addition, a hybrid power system on the smartcard 504 may be used with a short-term power storage 960 element to store the harvested energy, such as a super-capacitor. The short-term power storage element 960 can advantageously be charged or activated by power from a powering coil on a mobile phone or in a powering coil installed near the POS terminal 502 at power unit 1940. Thus the harvested energy may be stored at a short-term power storage element of the smartcard 504. The short-term power storage element may be a super-capacitor.

The client device 900 may be a smartcard. The smartcard 900 harvests and saves power during any physical contact made with a point of sale terminal 1900. Such harvesting may occur through a charging system nearby the point of sale terminal 1900.

Drawing power from the POS terminal 502 at power unit 1940 to power unit 940 is advantageously also possible in a powered smartcard embodiment. Similarly, the hybrid power system described above may also be present on a powered smartcard embodiment.

The heart rhythm or cardiac waveform of a user in distress may be detected through the pressure sensitive circuits 508 at PIN input 922. When such a detection is made, a signal is sent through the POS communication module 950 to the POS terminal 502 within transaction data generated for the transaction. Advantageously, if the user were being forced to use their smartcard under duress, the heart rhythm or cardiac waveform detected at the pressure sensitive circuits 508 and sent through the POS terminal 502 would indicate elevated levels of certain heart rhythm or cardiac waveform parameters that would be detectable by the smartcard 504. In such an event, the police could be dispatched to assist the user.

The user may further use an insertion method as shown in FIG. 5 through insertion of the smartcard 518 into POS terminal 514. The user may then enter a PIN to complete the financial transaction. Such PIN entry may serve to further heighten the security settings of the smartcard 518. In order to add an additional factor into the security method, the smartcard 518 is equipped with two pressure sensitive circuits 516. These pressure sensitive circuits 516 are capable of picking up the heart rhythm or cardiac waveform of the smartcard 518 user. The user has previously saved this heart rhythm or cardiac waveform on the smartcard 518 at a bank or bank-authorized ATM. The smartcard 512 has internal schematics similar to those of smartcard 504, and so references to FIGS. 9 and 10 will not be repeated.

When a match occurs, the smartcard 518 will begin communicating with the POS terminal 514, and the financial transaction can commence. A communication 520 can take place to the financial network 522.

When a match between the heart beat information supplied by the user and the heart beat information stored on the smartcard 518 occurs, the smartcard 518 will illuminate an LED light 526 to indicate a match has taken place and the smartcard is authorized. The smartcard 518 may activate a sound alert 542 instead of or in addition to the LED light 526. Alternately, the smartcard 518 illuminates the LED light 526 to indicate an authorization attempt has failed The smartcard 518 may activate a sound alert 542 instead of or in addition to the LED light 526. Such illumination is controlled by the Light Activator 930. If the smartcard 518 has an internal power source, this match can take place before the smartcard 518 interfaces with the POS terminal 502. An enable button 528 is present on the smartcard 518 to allow the user to start the process of matching their heart rhythm or cardiac waveform. Specifically, a step of depressing the enable button 528 may occur to allow physical movement to be entered at the smartcard 518. Where the enable button 528 is present, the pressure sensitive circuits 508 may advantageously not be activated by accident when the card is in a purse or wallet, which might otherwise result in a drained battery.

The smartcard 518 may have a fingerprint reader 532. The smartcard 518 may use a secure enclave method to confirm a user's fingerprint matches the fingerprint of the owner of the smartcard 518.

The smartcard 518 may illuminate its LED light 526 when the smartcard is brought into proximity to the POS terminal 514 and the smartcard 518 is authorized. The smartcard 518 may illuminate its LED light 526 when the smartcard is brought into proximity to the POS terminal 514 and the smartcard 518 is not authorized.

A predetermined number of failures by the user at the POS terminal 514 to perform the correct actuation sequence into input module 906 results in the smartcard 518 going dormant for a period of time.

The POS terminal 518 may signal success of the financial transaction by displaying a message that the transaction is being processed.

The system 500 may further include a sub-dermal implant 530 under a user's skin, which can emit a passive RFID chip signature. Such a signature provides a unique identification to the smartcard 518 to indicate that the user is the owner of the smartcard. The actuation sequence may occur when the sub-dermal implant is brought within close proximity of the smartcard. The signature is received by the input module 906 of FIG. 9 at additional input 929. The signature is checked by checking module 932 against the signature stored in additional memory 918. Such a sub-dermal implant 530 acts similar to the contact-less feature of the smartcard itself. The sub-dermal implant 530 can advantageously provide a second-factor authentication when doing smartcard financial transactions. If the user has installed a sub-dermal implant 530, the user proceeds to their bank or authorized bank ATM prior to using the sub-dermal NFC for financial transactions. At their financial institution, the user is given an interface and procedure that links the unique RFID signature of the sub-dermal implant 530 directly to the smartcard 518. This is done by saving the unique RFID signature associated with the sub-dermal implant 530 on the tamper-proof memory of the smartcard 504 at additional memory 918 of memory 902. Only when the user's RFID chip 530 is in proximity to a fully powered smartcard will the RFID chip 530 be able to receive power to provide an identification sequence. Such a smartcard 504 may be self-powered with a battery 942 or may receive power from a POS terminal 502 from power unit 1940 to power unit 940. The signature of the RFID chip of the sub-dermal implant 530 advantageously is unique and is intrinsic to a single user. The sub-dermal implant 530 may be powered through NFC inductive coupling techniques from the smartcard.

In an embodiment, there is a system for increasing security in a financial transaction when using a smartcard 504. The system comprises a smartcard 504, a point of sale terminal 502, a network 522 or 524, and a financial institution (not shown). The smartcard 502 is configured with an actuation sequence at the financial institution. The smartcard 502 authorizes a transaction at the point of sale terminal 502 only when a user of the smartcard 502 enters the actuation sequence at the time of the transaction.

The point of sale terminal 502 is configured to record payment details from the smartcard 502 once the financial transaction is authorized and transmit a request for payment through the network 522, 524 to the financial institution according to the payment details.

The financial institution is configured to make payment to the owner of the point of sale terminal 502 according to the payment details.

The smartcard 504 may have a camera 540. The smartcard 504 may be able to perform facial recognition or an iris scan to confirm the user is the owner of the smartcard 502. Input from the camera is received by the smartcard 900 at additional input 929 of input module 906.

In an embodiment, the smartcard 504 contains memory 902 for securely storing an actuation sequence. The smartcard 504 may contain processing logic at processor 904 to interface with a POS terminal 1900 or a SPED. The smartcard 504 may be able to interface to a POS terminal 1900 or a SPED through an electrical contact interface. The smartcard 504 may be able to interface to a POS terminal 1900 or a SPED through an RFID interface. The smartcard 504 may be compliant with the ISO/IEC 7810 standard. The smartcard 504 may be compliant with the EMVco standard.

The second actuation sequence entered at input module 906 may include a sequence of a number of physical actuators or buttons. The second actuation sequence may include a sequence of buttons on the smartcard 504 depressed in a specific order. The second actuation sequence may include a series of finger taps with a timing pattern.

A result of the matching of the second actuation sequence at the smartcard 504 may be indicated through at least one of an LED lamp, a sound alert, a color change, a message on a display, and a message on the POS terminal 1900.

Figure 6:
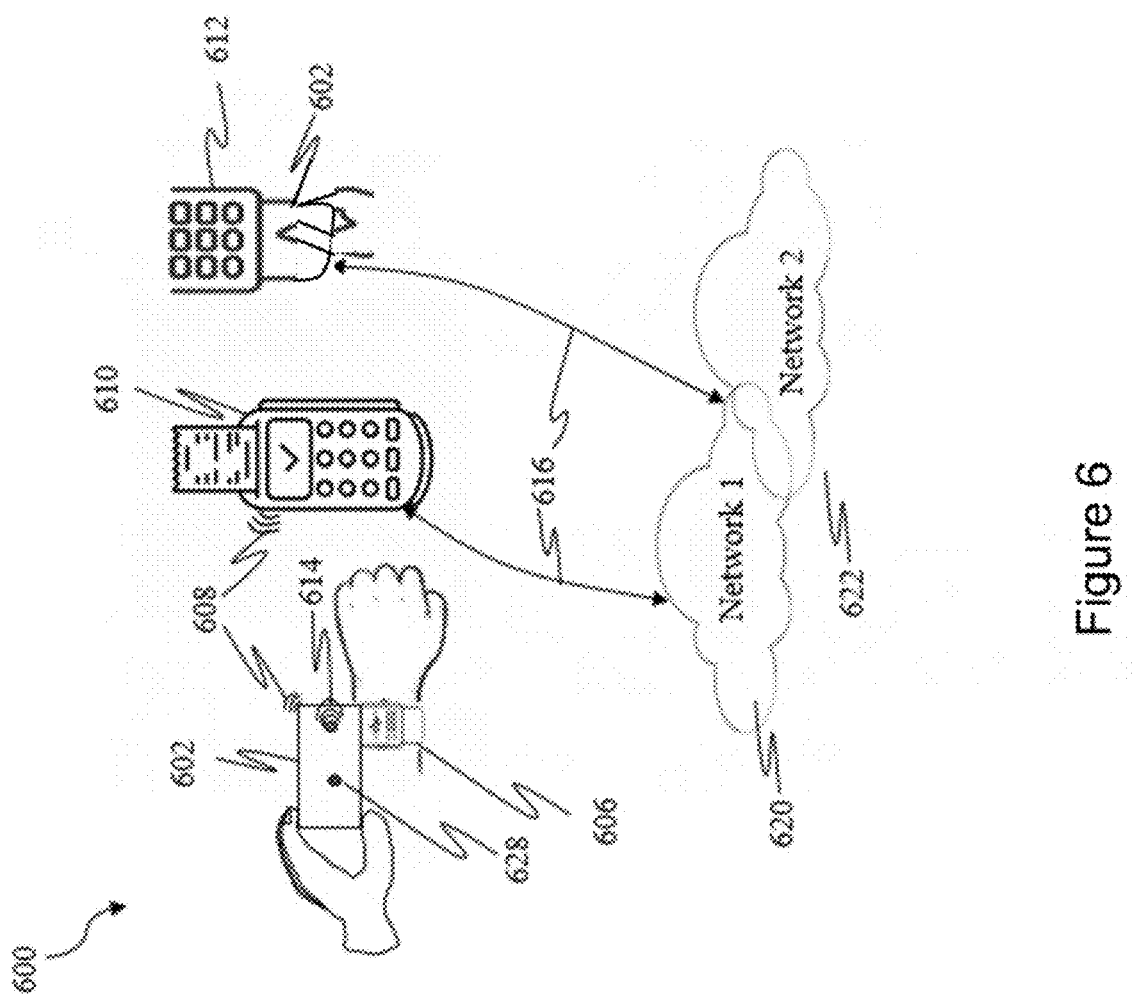
FIG. 6 illustrates an embodiment of a system for increasing security when using a smartcard.

Turning to FIG. 6, there is provided an illustration of a system 600 for increasing security when using a smartcard.

The system 600 can be utilized with a point of sale terminal 610 or 612. The user of a smartcard 602 wears one or more biometric sensors 606. The sensor 606 may be located on the wrist of the user, as in FIG. 6. The sensor 606 could also be located around the body of the user, for example, a belt or a heart monitor. Any such sensors 606 advantageously collect unique identifying information from the user, which includes but is not limited to the user's heart rhythm and brain waves.

The actuation sequence may include biometric information of a user collected by a biometric sensor 2700. Such unique identifying information is received within input module 906. Such unique identifying information is compared by checking module 932 against previously submitted unique identifying information of the user stored in memory 902. An increase in the number and quality of available biometrics advantageously yields an increase in the security of the smartcard 602.

For example, the heart rhythm is a high-quality biometric since it encodes information about the electrical conduction paths within the user's heart, the physical geometrical characteristics of the user's heart, the user's heart's location in the chest cavity, and the inhomogeneous conductive properties of the user's thorax.

Such sensors may be in the form of a commercially available smart watch, that normally collects biometric information on the wearer.

The smartcard 602 may be a powered smartcard. Such a powered smartcard has an internal power source at power unit 940 of FIG. 9. Such power unit 940 may further contain a battery 942.

The smartcard 602 may be a passive smartcard. While a passive smartcard may have a power unit 940 for absorbing energy harvested at or near a POS terminal 610, the passive smartcard will not have a battery 942.

The smartcard 602 may include a small LED light 614 that can be illuminated when the smartcard 602 is authorized. The smartcard 602 may include a small LED light 614 that can be illuminated when an authorization attempt fails. The smartcard 602 may include an LED light 614 that can be illuminated when the smartcard is brought into proximity to a POS terminal 610 and the smartcard 602 is authorized. The smartcard 602 may include an LED light that can be illuminated when the smartcard 602 is brought into proximity to a POS terminal 610 and authorization fails. The indicator may also take the form of an electrically induced color change such as an electrochromic color change, LCD, electronic display, or an e-ink display.

In order to make full use of the system 600, the user preregisters an actuation sequence in the memory 902 of the smartcard 602 at an authorized bank ATM or authorized actuation sequence capture center (not shown). Accordingly, the user enters the smartcard 602 into the ATM as normally done to perform a bank transaction or to create a PIN for the smartcard 602. Once the smartcard 602 is inserted, the user is provided a menu choice to record the actuation sequence within the smartcard 602. Once the user makes this selection, the smartcard 602 is ejected from the ATM, and a recording function of the smartcard 602 will advantageously remain active for a short period of time so that the user may record the actuation sequence within the smartcard 602 at the Memory 902. Subsequently, the user enters the actuation sequence by holding the smartcard 602 next to the heart-reading rhythm detection device 606 to perform a reading. The reading is received at sensor input 924 of Input Module 906.

The smartcard 602 may remain in the ATM while the user holds the smartcard 602 next to a special sensor on the bank ATM (not shown). Accordingly, it may be the ATM that records the reading. The bank ATM may also create an algorithm based on unique attributes of the heart rhythm of the user. The bank ATM then records this actuation sequence onto the smartcard 602 at memory 902 for later activation of the smartcard 602 for financial transactions. To activate the smartcard 602 for financial transactions, the user may hold their smartcard 602 to a belt or device located near the abdomen to be received at input module 906. Once the actuation sequence is saved at the bank ATM, the user can take the card to any retail environment and perform the actuation sequence again to enable the smartcard 602 for use in the financial transaction.

One or more of the sensors 606 may be combined to further strengthen the quality of the biometric information provided by the user to the smartcard 602 at the time of the financial transaction and to conclude with higher levels of confidence that the user is the owner of the smartcard. Accordingly, at the time of preregistering the actuation sequence at the authorized bank ATM or authorized actuation sequence capture center (not shown), the ATM or authorization center may be equipped to allow the user to perform several steps to create an actuation sequence in memory 902. Even the ordering of the actuation sequence may be important in achieving smartcard authorization. Furthermore, one or more of the sensors 606 may advantageously also help isolate difficult and dangerous situations. For example, a user in distress who is being forced to complete a financial transaction may have elevated and erratic heart rhythms and changes to EEG reading for brain wave activity. Such information may be received at input module 906. Advantageously, an owner of the POS terminal may advantageously be able to notify police and authorities when these dangerous situations take place.

A user attribute may be recognized using recognition methodologies or encoded algorithms embedded in the smartcard 602. Accordingly, the smartcard 602 is considered an "enclave", i.e., an execution environment that guarantees confidentiality by virtue of being isolated from outside networks such as financial networks 620, 622 during the attribute recognition process. Further security benefits include data integrity via the tamper-proof construction of smartcard 602 circuitry and verifiability due to the smartcard 602 having been constructed as an application-specific-device that is capable of performing only one action. In this regime, the recognition methodology may be modelled by a general embeddable process $R_u$ which maps a set of attributes $A_u$ to a particular unique value $ID_u$.

$$A_u \stackrel{R_u}{\to} \{0,1\}_u^n = ID_u$$

Then the specificity of $R_u$ is equivalent to the uniqueness of the $\stackrel{R_u}{\to}$ map over all u. The method may include a uniqueness requirement:

$$\exists ! u_f s \cdot t \cdot R_{u_f} A_{u_i = ID^{u_i}}$$

The method may also include a no-collision requirement:

$$\nexists u_f s \cdot t \cdot (R_{u_f} A_{u_i = ID^{u_i}}) \vee (R_{u_f} A_{u_i} = ID_{u_i})$$

However, it may suffice in the setting of smartcard security to relax these requirements to guarantees of near-uniqueness and strong collision-resistance, since the set of malicious users who try to authenticate with a fraud victim's card 602 may be significantly smaller than the set of all users. To address these relaxed requirements, the method may make use of composable-attribute-based security. The method may individually handle each attribute as a non-interacting component of the full algorithm $R_u$.

$$((r_0 a_0) \otimes (r_1 a_1) \otimes \ldots \otimes (r_n a_n))_u = $$
$$(r_0 \otimes r_1 \otimes \ldots \otimes r_n)_u (a_0 \otimes a_1 \otimes \ldots \otimes a_n)_u = R_u A_u$$

Each attribute contributes to the uniqueness of the $\stackrel{R_u}{\to}$ map proportional to its own specificity. In this construction, any attribute that is not perfectly randomly distributed in the population may contribute to the security of the card 602. The method may enable the use of attributes such as low-quality biometrics in conjunction with high-quality attributes to achieve a higher security improvement.

The system 600 may use a method for synthesizing embeddable signal recognition methodologies using Artificial Neural Networks (ANNs). The method includes characterizing a user's unique bio-signals and training a neural network to identify them. In the setting of a composable-attribute-based security model, an ANN is used to synthesize recognition algorithms with sufficient specificity for use as composable security mechanisms and sufficiently low dimensionality to be embedded in a smartcard 602. The method includes training the ANN without the need for storing user biometrics long-term. The method includes training the ANN using stochastically generated training datasets. Alternatively, the method includes training the ANN using public biometric data repositories, examples of which exist for heart rhythm data.

The smartcard 602 may recognize the physical attribute(s) of a user via real-time signal processing at the processor 904. Such a real-time method follows logically from the use of feed-forward Restricted Boltzmann Machines (RBMs) to synthesize recognition algorithms, as a trained RBM ANN constitutes a set of forward-only computations which can be captured by analog signal processing elements. One example of a compatible physical attribute is the hearth rhythm biometric. The heart rhythms of users may be identified using their spatial correlations in phase-space. The phase-space representation of a heart rhythm signal may be constructed in real-time by delaying the signal by three distinct amounts to create the three axes of the phase-space. In this embodiment, it may not be necessary to store a user's physical attribute(s) directly on a smartcard 602.

Once the user has saved their actuation sequence in memory 902 when coupled to an authorizing computer system (not shown), the smartcard 602 is ready for use. In FIG. 6, the user uses a TAP technique with an NFC communication method 608 for interaction of the smartcard 602 with point of sale terminal 610. Also in FIG. 6, the user uses an insertion technique for interaction of the smartcard 602 with a point of sale terminal 612. The POS terminal 610, 612 works to power the smartcard 602 and, if present, an LED light 614 would illuminate when the actuation sequence were successful. The LED light 614 is controlled by light activator 930. When the actuation sequence is successful, the POS terminal 610, 612 transmits a message 616 through one or more networks 620, 622 to the correct financial institutions (not shown) supporting the smartcard 602.

Figure 7:
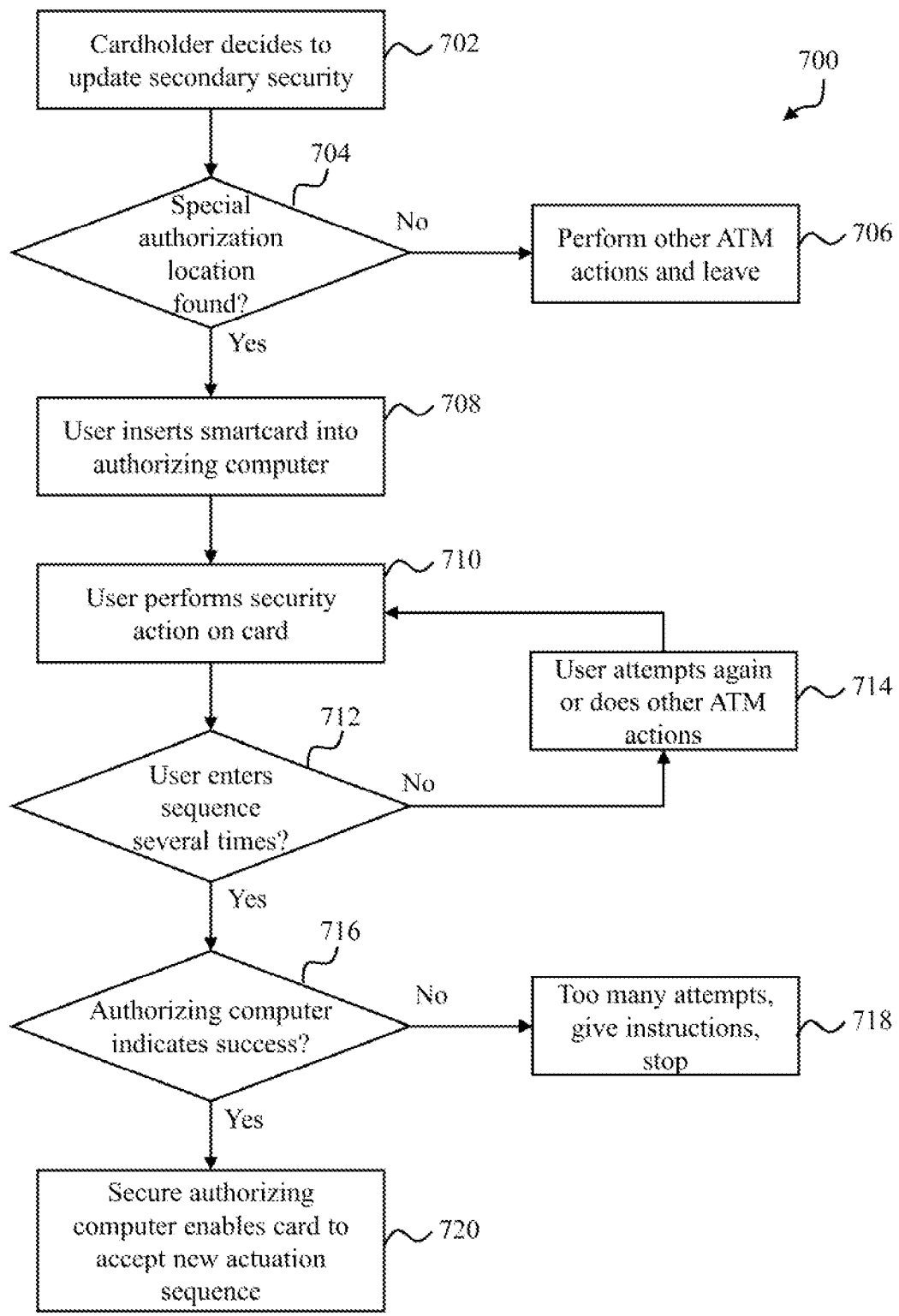
FIG. 7 is a flow chart showing an embodiment of a method for increasing security when using a smartcard between the user and the smartcard.

Turning now to FIG. 7, there is a flow chart 700 showing a method for increasing security when using a smartcard 602 between the user and the smartcard 602.

At 702, the user decides to establish or update the secondary security on the smartcard 602. The secondary security is stored at memory 902 of the smartcard 602.

At 704, the user proceeds to a bank, to an ATM, or to a special authorization center where they the actuation sequence may be able to be saved on their smartcard 602.

If the user is unable to find the correct type of special authorization location at 704, the user may have to perform other ATM functions at 706 and leave that ATM to look for another bank.

If the special authorization location has been found at 704, the user can then interface the smartcard 602 with an authorizing computer 22, such as an ATM, to begin establishing extra security at 708.

The user then performs a new actuation sequence on the smartcard 602 while interfaced with the authorizing computer 22 at 710. The authorizing computer 22 may be an ATM or other bank machine. The authorizing computer 22 may be a special-purpose bank computer designed for updating the security settings of the smartcard 602. The smartcard 602 may need to be in close proximity to the authorizing computer 22. The smartcard 602 may be removed from the authorizing computer 22 and may remain in actuation sequence record mode for a short period of time. For example, for one minute the smartcard 602 can store an actuation sequence from a worn biometric device 606 through sensor input 924 at input module 906 in biometrics storage 914 at memory 902. The actuation sequence is stored within a secure element 902, such as a tamper-proof chip, on the smartcard 602.

The authorizing computer 22 provides a unique identification that authorizes the updating of the actuation sequence. This process is similar to changing the PIN on the smartcard. In an embodiment, the authorizing computer 22 can also be equipped to validate the proximity of the valid user via facial recognition, a sub-dermal implant, a mobile phone, fingerprint scanner, iris scanner, heart rhythm sensor, tap sensor, or voice print sensor. The authorizing computer 22 can use that sensed information to update the security settings of the smartcard 602.

Before the process can commence, the user will already have provided a current PIN associated with the smartcard 602 so that the authorizing computer 22 can confirm the user's identity. The user provides this PIN through PIN input 922 to be checked by checking module 932 against PIN storage 912. Depending on the type of actuation sequence the user is using, the user may have to enter the sequence several times at 712 so that the smartcard 602 can obtain a solid and reproducible set of actuation movements and sequences.

For example, if the actuation sequence is a series of tap motions on a touch sensitive pad with a user finger, it is likely that several tap sequences will have to be repeated at 712. The actuation sequence may be a series of finger taps made against one or more touch-sensitive pads located on the smartcard. The actuation sequence may take place through a series of taps performed each time the smartcard touches a contactless-enabled POS terminal. The actuation sequence may include the user performing a series of mechanical taps against the POS terminal 610 to identify themselves as the smartcard owner. The series of mechanical taps performed may include long, short, or a combination of long and short taps combined. If the sequence is a heart rhythm or a sub-dermal implant, the actuation sequence might not have to be repeated at 712.

If the user fails to repeat the sequence correctly at 712, the user is taken back to re-enter the sequence at 714. If the user further fails a preset number of times, the process is aborted.

The user provides this input through input module 906 to be checked by checking module 932 against memory 902.

After several successful sequence repeats, the authorizing computer 22 will indicate a success at 716. If the authorizing computer 22 does not indicate success, then too many unsuccessful attempts have been made. Alternately, the smartcard 602 may be unable to be updated for some technical reason at 718, e.g., because the smartcard 602 is damaged, too old, or without power. If the authorizing computer 22 does indicate success, the smartcard 602 is enabled with a secondary security action at 720 to be used for financial transactions.

Figure 8:
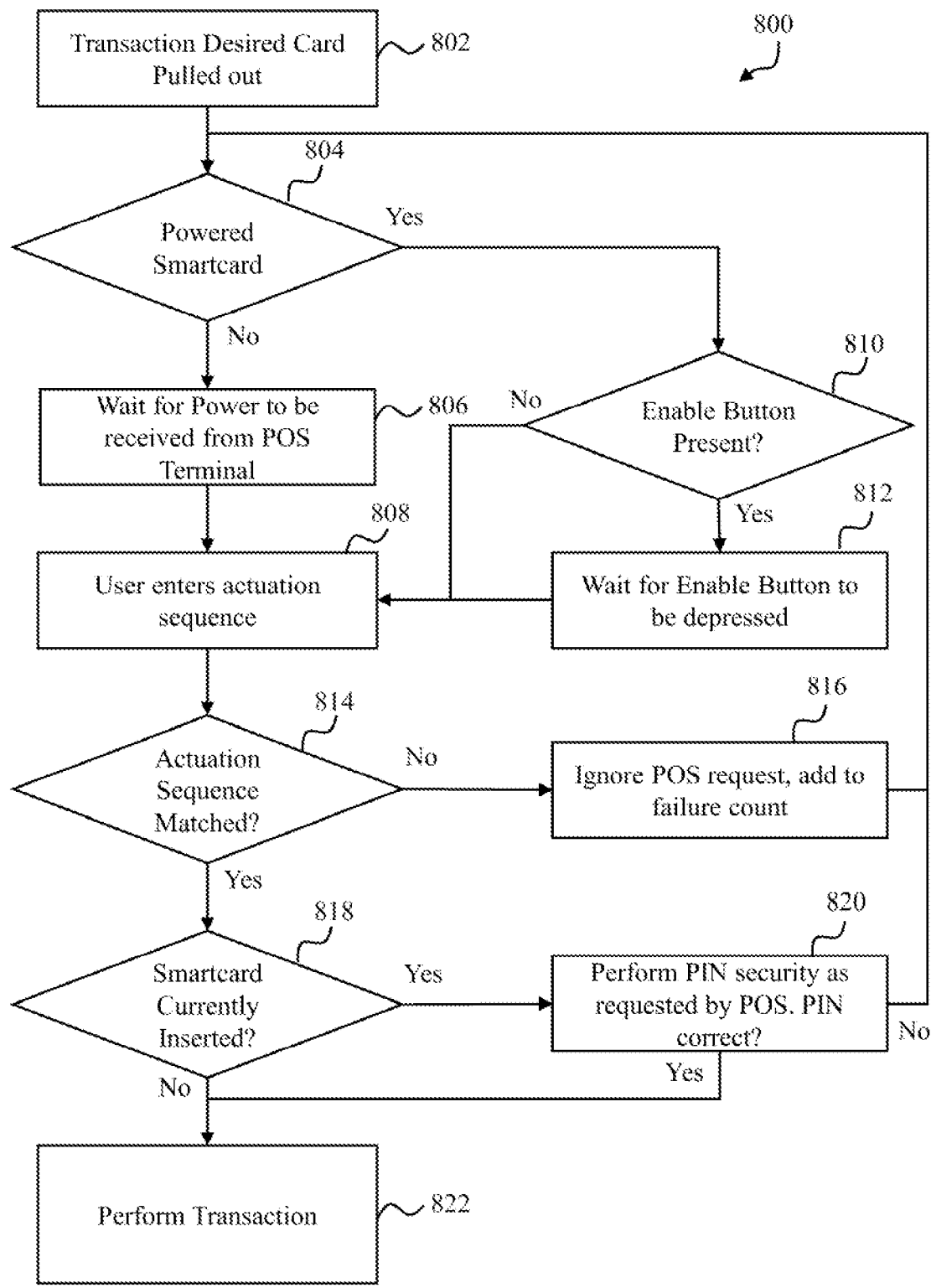
FIG. 8 is a flow chart showing an embodiment of a method for increasing security when using a smartcard.

Turning now to FIG. 8, there is a flow chart of a method 800 for increasing security when using a smartcard.

At 802, the user prepares to use a smartcard 602 for a financial transaction.

If the smartcard 602 is a powered smartcard at 804, then the user may press an enable button 628 at 810. That input is received at button input 928. An enable button 628 may be present on a powered smartcard to avoid activating the security sequence needlessly and draining battery power.

If the enable button 628 is present, then no action is taken until the enable button 628 is depressed at 812.

Once the enable button 628 is depressed, the user can enter the actuation sequence at 808 at input module 906.

If the enable button 628 is not present on the powered smartcard at 810, the user simply enters the actuation sequence at 808.

If the smartcard 602 is not powered, the software does nothing until power is received from the POS terminal 610 at 806 from power unit 1940 to power unit 940.

Once the power is received, the user can enter the actuation sequence at 808 at the point of sale terminal 610 to be received at input module 906. For both powered and passive smartcards, the smartcard 602 checks that the actuation sequence entered matches a saved actuation sequence at memory 902 on the smartcard 602 through checking module 932.

If the actuation sequence does not match the saved actuation sequence at 814, the smartcard 602 ignores the POS request for data exchange through POS communication module 950, disallows the financial transaction, and adds a failure to a count of actuation sequence attempts at 816. If the count of actuation sequence attempts reaches a preset threshold, the smartcard 602 may disable itself and the user may have to travel to the issuing bank or an ATM thereof to correct the situation. If the actuation sequence does match at 814, the interaction with the POS terminal is allowed.

If the smartcard 602 is inserted into a POS terminal at 818, then a PIN will be requested at 820. If the PIN entered at 820 at PIN Input matches the PIN stored at PIN storage 912 according to checking module 932, the transaction proceeds to 822. If the PIN entered at 820 is not correct according to checking module 932, the transaction is aborted and the user begins again.

If the smartcard is being used in a contact-less mode at 818, then the communications will proceed directly to 822. With one or both security requirements entered, the smartcard 602 and POS terminal proceed to complete the transaction at 822.

While the smartcard is not enabled, it can be programmed to ignore the transaction request from the POS terminal 1900. The smartcard may be programmed to respond with an error code indicating that the smartcard is not activated. This error code may be used to display an appropriate message, for example to the SPED or POS terminal 1900.

Figure 9:
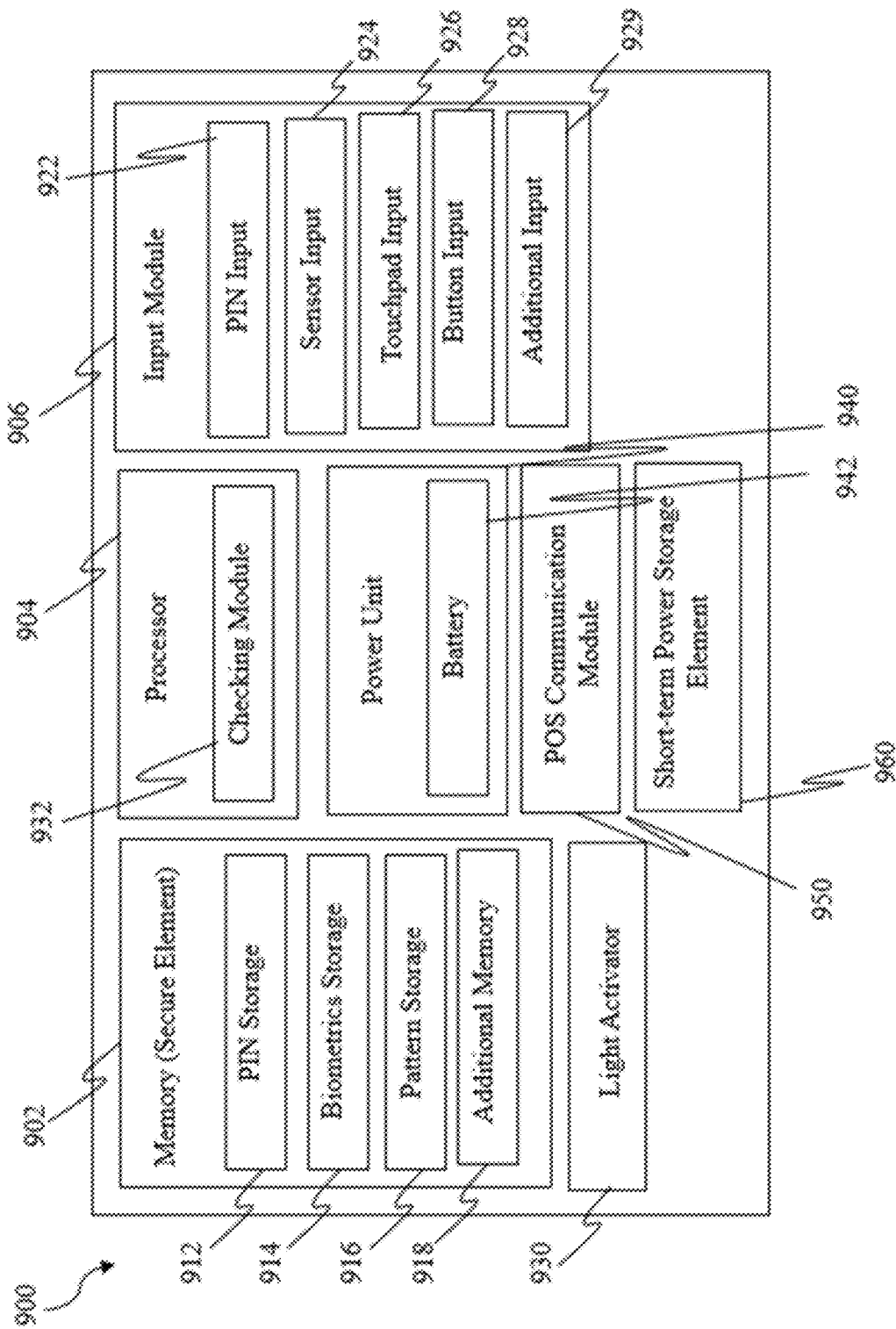
FIG. 9 is a block view of the internal schematics of a client device for increased security in a financial transaction.

Turning now to FIG. 9, shown therein is a block view of the internal schematics of a client device for increased security in a financial transaction according to an embodiment.

The client device 900 contains a memory (secure element) 902 for storing one or more actuation sequences.

The actuation sequences are provided by a user through the input module 906. The user may provide such actuation sequences for secondary security to the memory 902 when the user and device 900 are at the user's bank or an ATM thereof.

Depending upon the type of security settings and actuation sequences to be updated, the new settings and sequences are received through PIN input 922.

The new settings and sequences are stored at PIN storage 912, in the case of a PIN.

The new settings and sequences are received at sensor input 924 in the case of user biometric information, such as a heartbeat.

The new settings and sequences are stored at biometrics storage 914 in the case of user biometric information, such as a heartbeat.

The new settings and sequences are received at touchpad input 926, in the case of a pattern entered on a touchpad of the device 900.

The new settings and sequences are stored at pattern storage 916, in the case of a pattern entered on a touchpad of the device 900.

In the case of any other settings and sequences, they are received at additional input 929.

Such other settings and sequences are stored at additional memory 918.

Comparison between the input received at the input module 906 and the memory 902 is performed by the checking module 932 of the processor 904.

Button input 928 receives input from an enable button of a client device 900 when the user presses the enable button to begin providing input before a financial transaction.

Power to the input module 906 and the memory (secure element) 902 is provided by the power unit 940. Where the client device 900 is a powered smartcard, that power may be in the form of a battery 942. Power is also provided to the processor 904, the POS communication module 950, and the light activator 930.

The POS communication module 950 is used to communicate information to the POS terminal at which the client device 900 is being used. For example, information that a user's information does or does not match the information stored in the memory 902.

Upon such success or failure of the matching, the light activator 930 may activate an LED light of the client device 900.

The client device 900 contains a short-term power storage element 960. Harvested energy may be stored at the short-term power storage element 960. The short-term power storage element 960 can be charged or activated by power from a powering coil on a mobile phone or in a powering coil installed near the POS terminal. The short-term power storage element 960 can provide power to the entire client device 900. The short-term power storage element 960 may be a super-capacitor.

In an embodiment, the client device 900 to be used in a financial transaction comprises a secure element 902 for storing data. The client device 900 further contains an input module 906 configured to receive data from an issuing financial institution (not shown). Such data is for storage in the secure element 902. The input module 906 is further configured to receive data from the user of the client device 900 to verify user identity at the time of the financial transaction. The client device 900 further contains a checking module 932 for comparing data stored on the secure element 902 with data received from the user through the input module 906.

The user may enter the actuation sequence at the input module 906 multiple times to ensure correctness.

The smartcard 900 may no longer recognize a previous actuation sequence stored on the secure element 902 of the smartcard 900 as correct.

The step of depressing a button 528 to allow the physical movement to be entered at button input 928 may take place before the smartcard 900 interfaces with the point of sale terminal 1900.

The step of depressing a button 528 to allow the physical movement to be entered at button input 928 may take place after the smartcard 900 interfaces with the point of sale terminal 1900.

Energy may be harvested over NFC, or though insertion of the smartcard 900 at the POS terminal 1900, or through making contact with the smartcard with the POS terminal 1900, from power unit 1940 to power the smartcard 900 at power unit 940.

All matching may be done locally on the smartcard 900 at checking module 932, and no actuation sequence information may be transmitted to the point of sale terminal 1900.

Matching may be at least partially done on the point of sale terminal 1900 at processor 1904, and some actuation sequence information may accordingly transmitted to the point of sale terminal 1900.

The actuation sequence may occur before the smartcard 900 is brought into close proximity of the point of sale terminal 1900.

The actuation sequence may occur immediately after the smartcard 900 is brought into close proximity of the point of sale terminal 1900.

Each successful actuation sequence may allow only one financial transaction to be completed with the smartcard 900.

Each successful actuation sequence may allow an unlimited number of financial transactions to be completed with the smartcard 900 within a timeframe previously agreed upon by the user, the financial institution, or both.

The point of sale terminal 1900 may print a physical receipt (not shown) with the payment details upon successful completion of the financial transaction.

The point of sale terminal 1900 may query the financial institution of the smartcard 900 as to the sufficiency of funds in one or more accounts of the user.

The point of sale terminal 1900 may proceed with the financial transaction only if the sufficiency of funds in the one or more accounts of the user is confirmed.

Biometric information of users may be identified at the checking module 932 using spatial correlations in phase-space, the phase-space representation of a signal being constructed in real-time by delaying the signal by three distinct amounts to create three axes of the phase-space.

The biometric information of users may comprise a heart rhythm or cardiac waveform of the user, and the signal may comprise heart rhythm or cardiac waveform information of the user received at input module 906.

The smartcard 900 may contain a power storage element for storing power or energy. The power storage element may be a lithium ion battery, for example battery 942 in smartcard 900. The power storage element may be a super capacitor.

The smartcard 900 may further comprise a circuit (not shown) to measure a biometric waveform of the user. The biometric waveform may be a heartbeat pulse waveform. The biometric waveform may be the audio waveform of a spoken phrase.

The smartcard 900 may further comprise a wire coil (not shown) that can be energized by an AC magnetic field. The smartcard 900 may further comprise a charging means to transfer energy from the wire coil to the power storage element.

In an embodiment, there is a smartcard 900 for verifying user identity in a financial transaction. The smartcard 900 contains a secure memory 902 for storing a first actuation sequence.

The smartcard 900 further contains an input module 906 for receiving a second actuation sequence. The input module 906 can receive the second actuation sequence from the user of the smartcard 900 to verify user identity at the time of the financial transaction.

The smartcard 900 further contains a checking module 932 for comparing the first actuation sequence with the second actuation sequence.

The smartcard 900 further contains a point of sale communication module 950 for receiving and transmitting electronic information between a POS terminal 1900 and the smartcard 900.

Figure 10:
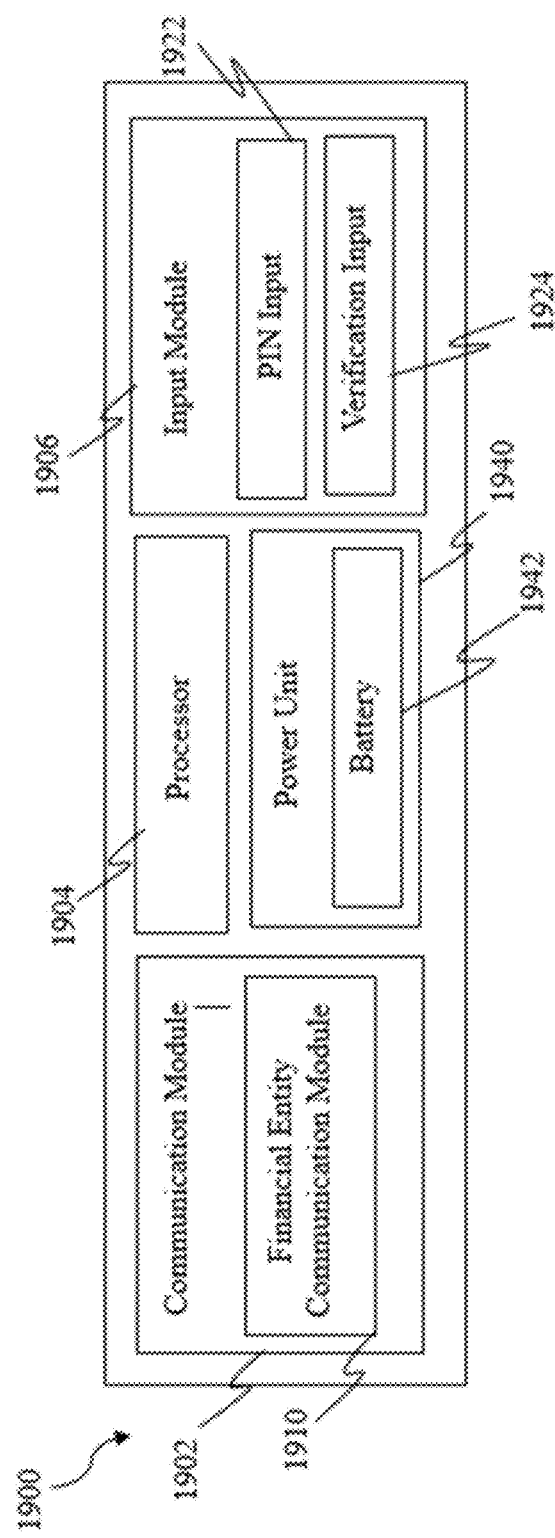
FIG. 10 is a block view of a POS terminal with which a client device of FIG. 9 interfaces during a financial transaction.

Turning now to FIG. 10, shown therein is a block view of a POS terminal 1900 with which a client device 900 interfaces during a financial transaction.

The POS terminal 1900 contains a communication module 1902, which further contains a financial institution communication module 1910. The financial institution communication module is for relaying financial transaction details to the bank of the user of the client device 900 where the client device 900 is a smartcard.

The power unit 1940 may contain a battery 1942 and powers the communication module 1902, the processor 1904, and the input module 1906.

The input module 1906 further contains PIN input 1922, for receiving a user's input of a PIN.

The input module 1906 further contains verification input 1924, for receiving information that a user's information provided to the client device 900 at input module 906 does or does not match the information stored in the memory 902.

In an embodiment, the POS terminal 1900 is a payee server containing an input module 1906 configured to receive authentication data from a client device 900 in a financial transaction to confirm the identity of a user of the client device 900. The input module 1906 is further configured to receive transaction information from the client device 900 for transmission through a network (not shown) to a financial institution (not shown) of the client device 900 to ensure payment. The transaction information includes an amount of money to be paid by the user of the client device 900. The payee server 1900 further includes a financial institution communication module 1910 configured to request payment through the network from the financial institution of the client device 900 upon successful completion of the financial transaction. The financial institution communication module 1910 is further configured to query the financial institution of the client device 900 for validity information as to the validity of the client device 900 and to receive the validity information.

The payee server 1900 further contains a processor 1904 configured to approve the financial transaction if the authentication data received from the client device 900 confirms the identity of the user of the client device 900 and the validity information received from the financial institution of the client device 900 confirms the validity of the client device 900.

In an embodiment, there is a point of sale terminal 1900 for facilitating a financial transaction with a smartcard 900. The point of sale terminal 1900 contains an input module 1906 for receiving authentication data from a smartcard 900 in the financial transaction. The authentication data is to confirm the identity of a user of the smartcard 900. The input module 1906 can further receive payment details from the smartcard 900. Such payment details are for transmission through a network to a financial institution of the smartcard 900 in order to ensure payment. The payment details include an amount of money to be paid.

The point of sale terminal 1900 further contains a financial institution communication module 1910 for requesting payment through the network from the financial institution of the smartcard upon successful completion of the financial transaction. The financial institution communication module 1910 can further query the financial institution of the smartcard 900 for validity information as to the validity of the smartcard 900. The financial institution communication module 1910 can further receive the validity information.

The point of sale terminal 1900 further contains a processor 1904 for approving the financial transaction is the authentication data received from the smartcard 900 confirms the identity of the user of the smartcard 900 and the validity information received from the financial institution of the smartcard 900 confirms the validity of the smartcard 900.

Figure 11:
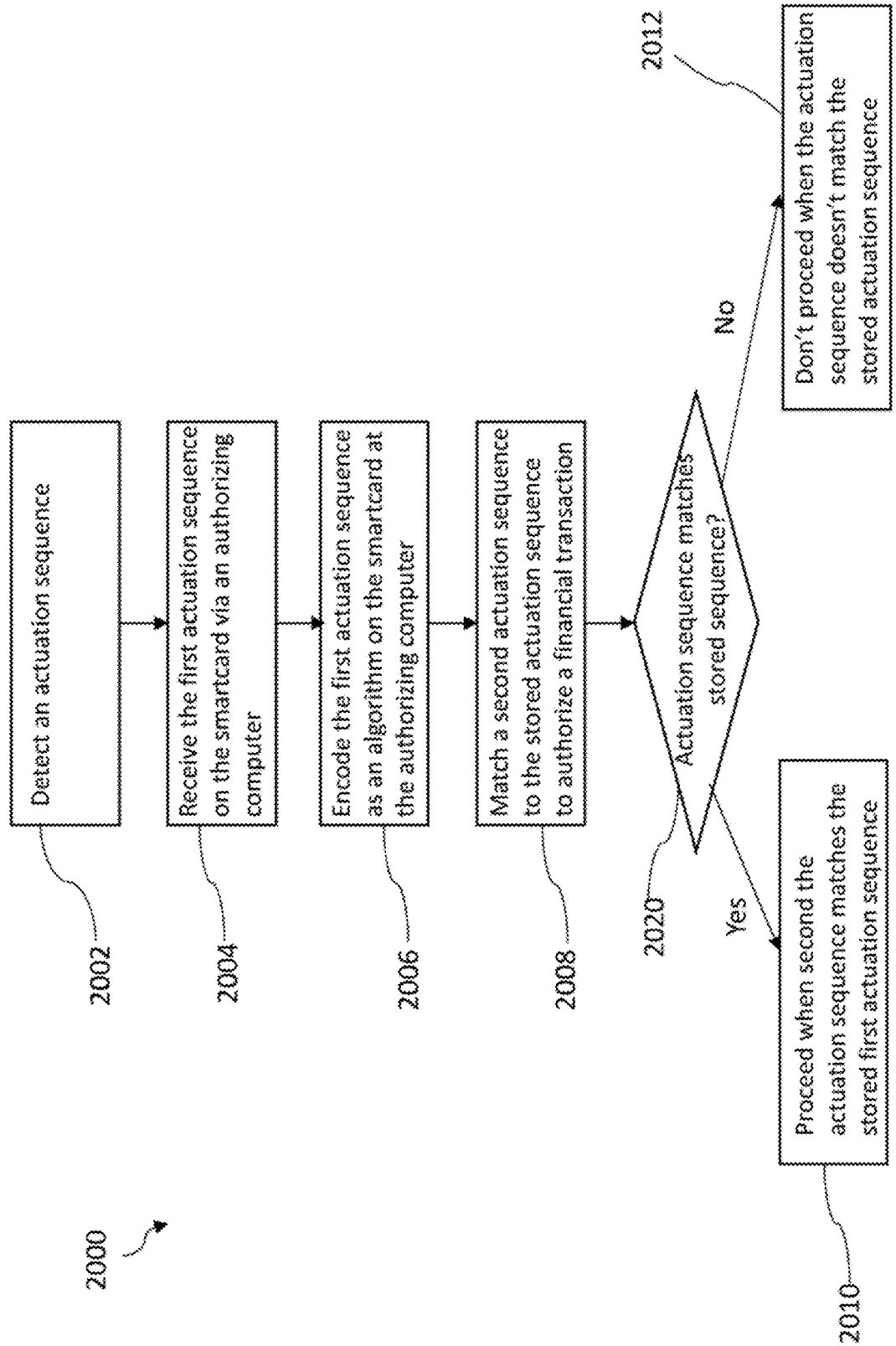
FIG. 11 is a flow chart of a method for activating a smartcard for financial transactions using a second actuation sequence.

Turning now to FIG. 11, there is a flow chart of a method 2000 for activating a smartcard 602 for financial transactions using a second actuation sequence.

At 2002, a first actuation sequence is detected on the smartcard 602.

At 2004, the first actuation sequence is received on the smartcard 602 at the identity module 906 indicating authorization via the authorizing computer 22.

At 2006, the first actuation sequence is encoded as an algorithm on the smartcard 602. This encoding occurs while the smartcard 602 is located at the authorizing computer 22. This encoding occurs such that the first actuation sequence is not stored in a readable form on the card 602 at the memory 902.

At 2008, a second actuation sequence is matched to the stored first actuation sequence. This matching occurs to authorize a financial transaction via processor 904.

If the second actuation sequence matches the stored first actuation sequence at 2020, the transaction proceeds to 2010. If the second actuation sequence does not match the stored first actuation sequence, the transaction proceeds to 2012.

At 2010, the financial transaction is allowed to proceed when the second actuation sequence matches the stored first actuation sequence at memory 902 according to checking module 932.

At 2012, the financial transaction is blocked from proceeding when the second actuation sequence fails to match the stored first actuation sequence at memory 902 according to checking module 932.

Figure 12:
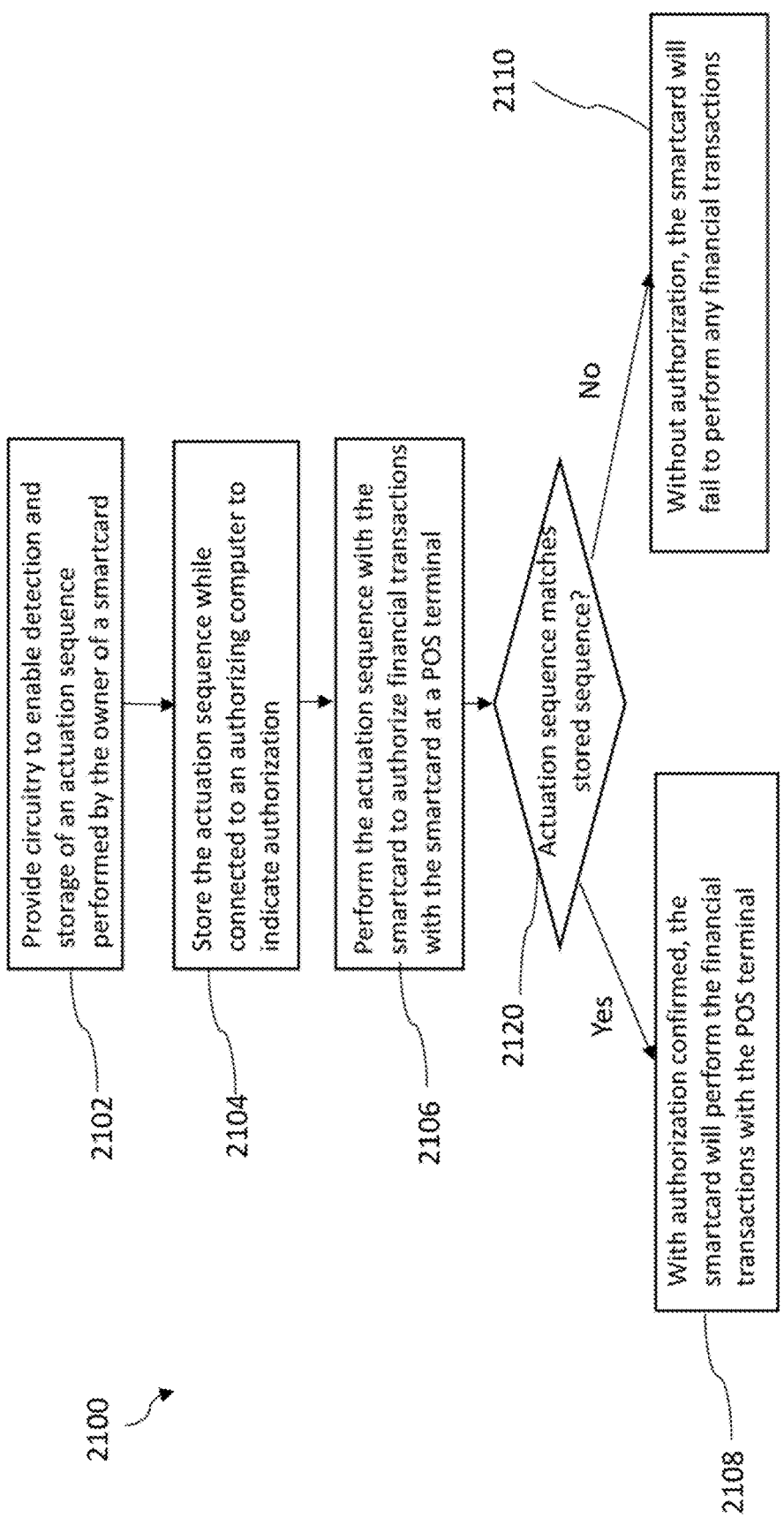
FIG. 12 is a flow chart of a method for a smartcard owner to authorize the use of a smartcard for financial transactions.

Turning now to FIG. 12, there is a flow chart of a method 2100 for a smartcard owner to authorize the use of a smartcard 602 for financial transactions.

At 2102, circuitry is provided to enable detection of a first actuation sequence performed on the smartcard 602 at input module 906. The circuitry provided further enables storage of the first actuation sequence at memory 902.

At 2104, the first actuation sequence is stored on the smartcard 602 at memory 902. Storage occurs while the smartcard 602 is connected to an authorizing computer 22. Authorization is indicated via the authorizing computer 22.

At 2106, a second actuation sequence is performed with the smartcard 602 to authorize financial transactions with the smartcard 602 at the POS terminal 1900.

If the second actuation sequence matches the stored first actuation sequence at 2120, the financial transaction proceeds to 2108. If the second actuation sequence does not match the stored first actuation sequence at 2120, the financial transaction proceeds to 2110.

At 2108, with authorization confirmed, the smartcard 602 will perform the financial transactions at the POS terminal.

At 2110, without authorization, the smartcard 602 will fail to perform any financial transactions.

Figure 13:
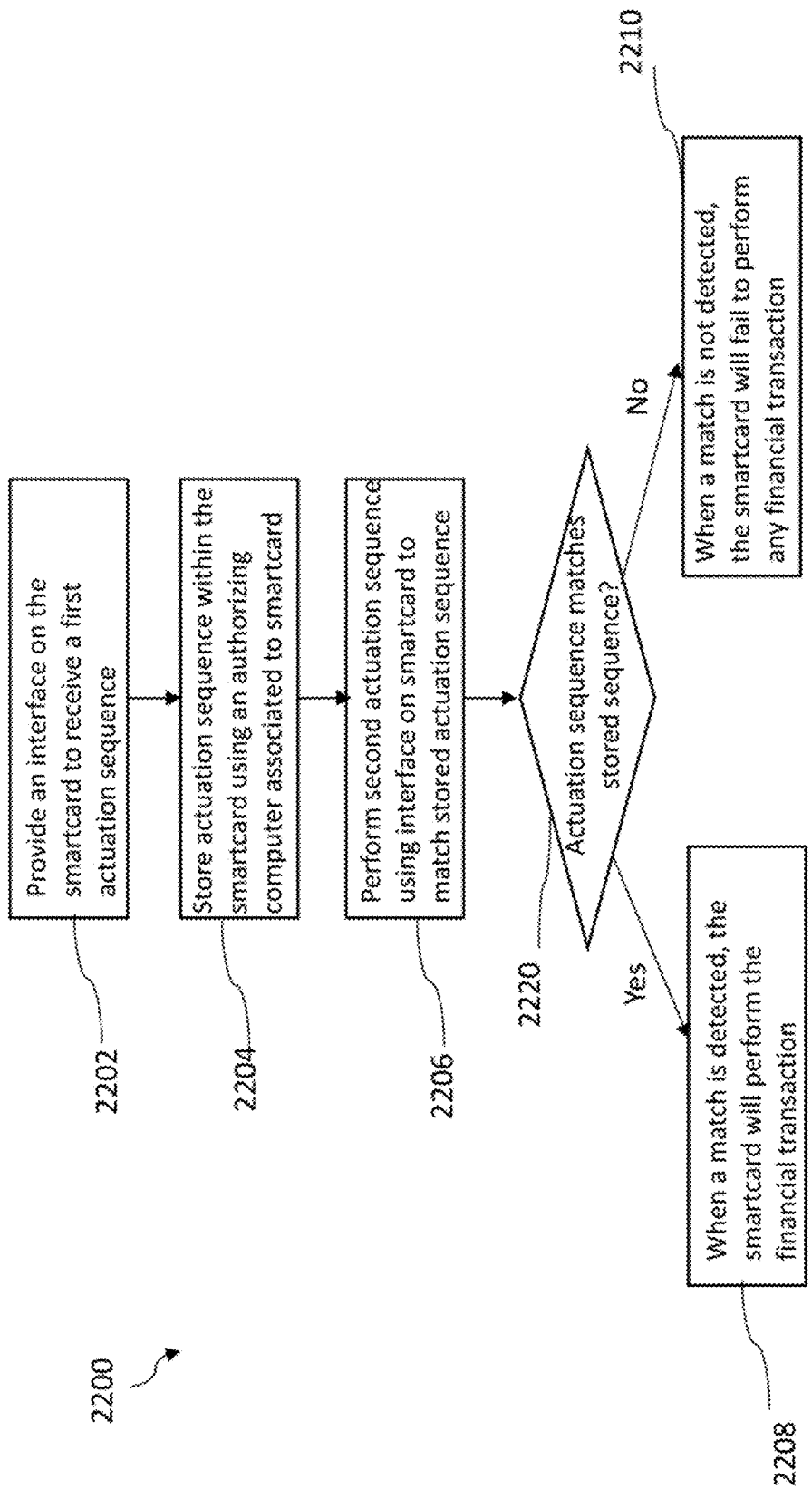
FIG. 13 is a flow chart of a method for adding an additional security step to a smartcard to authorize its use for financial transactions.

Turning now to FIG. 13, there is a flow chart of a method 2200 for adding an additional security step to a smartcard 602 to authorize its use for financial transactions.

At 2202, an interface is provided on the smartcard 602. Through the interface, the smartcard 602 receives a first actuation sequence at input module 906.

At 2204, the first actuation sequence is stored within the smartcard 602 at memory 902. The storage occurs by using an authorizing computer 22. The authorizing computer 22 is associated to the smartcard 602.

At 2206, an attempt is made to enable the smartcard 602. The attempt includes performing a second actuation sequence, using the interface on the smartcard 602, to match the stored first actuation sequence.

If the second actuation sequence matches the stored first actuation sequence at 2220, the financial transaction proceeds to 2208. If the second actuation sequence does not match the stored first actuation sequence at 2220, the financial transaction proceeds to 2210.

At 2208, when a match is detected between the first and second actuation sequences according to a checking module 932, the smartcard 602 will perform the financial transaction.

At 2210, when a match is not detected between the first and second actuation sequences according to the checking module 932, the smartcard 602 will fail to perform any financial transactions.

Figure 14:
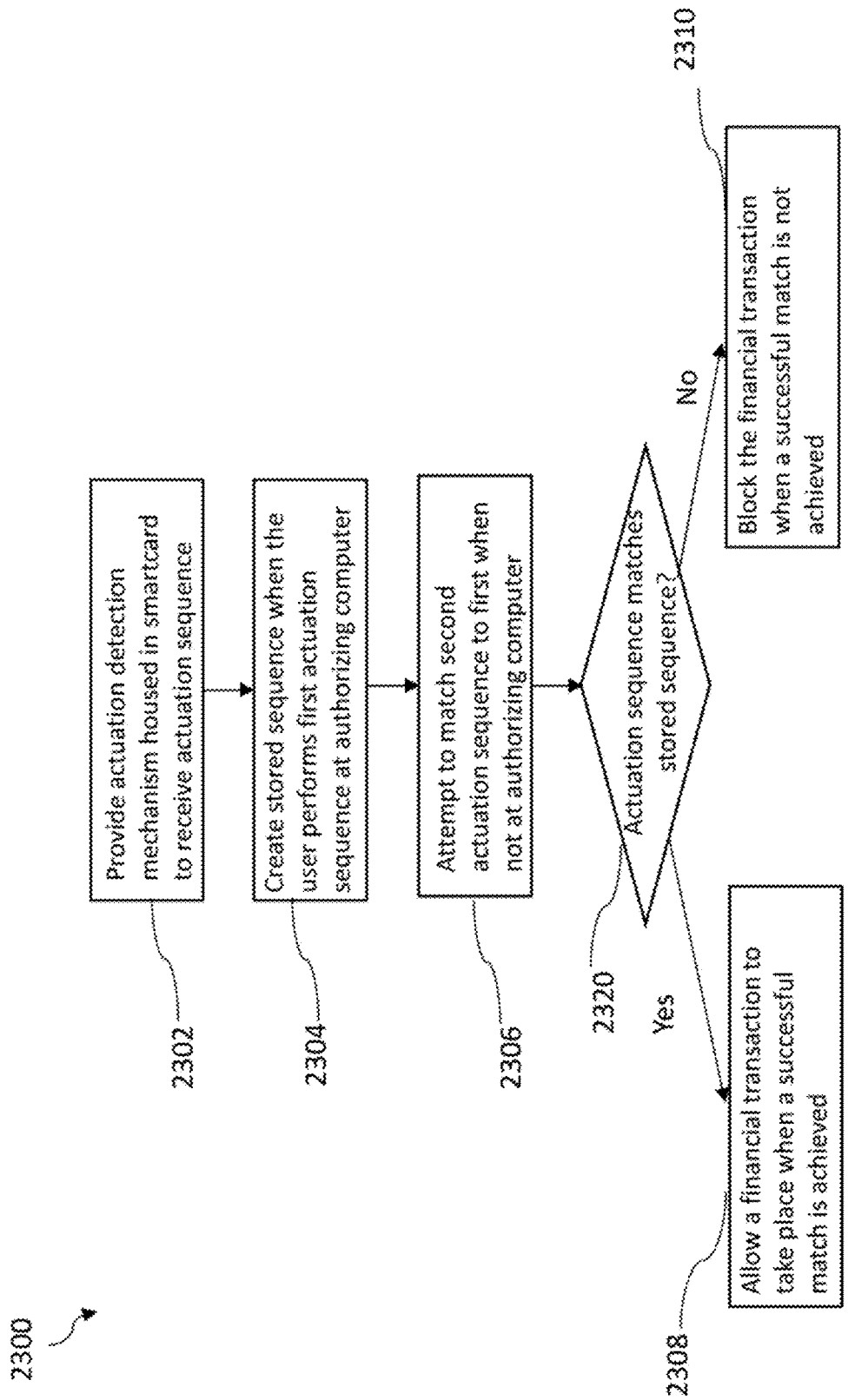
FIG. 14 is a flow chart of a method for enabling use of a smartcard by a user for financial transactions.

Turning now to FIG. 14, there is a flow chart of a method 2300 for enabling use of a smartcard 602 by a user for financial transactions.

At 2302, an actuation detection mechanism housed within the smartcard 602 is provided to receive a first actuation sequence. The first actuation sequence is received at input module 906.

At 2304, the mechanism is used to create the stored first actuation sequence within the smartcard 602. The stored first actuation sequence is created at memory 902 when the user performs the first actuation sequence on the smartcard 602 and the smartcard 602 is coupled to an authorizing computer system 22.

At 2306, an attempt is made to match a second performed actuation sequence to the stored first actuation sequence at the memory 902. The attempt makes use of the checking module 932. The attempt occurs when the second performed actuation sequence is detected by the mechanism while the smartcard 602 is not in proximity to the authorizing computer system 22.

If the second actuation sequence matches the stored first actuation sequence at 2320, the financial transaction proceeds to 2308. If the actuation sequence does not match the stored actuation sequence at 2320, the financial transaction proceeds to 2310.

At 2308, the financial transaction is allowed to take place when a successful match is achieved according to the checking module 932.

At 2310, the financial transaction is blocked when the successful match is not achieved according to the checking module 932.

Figure 15:
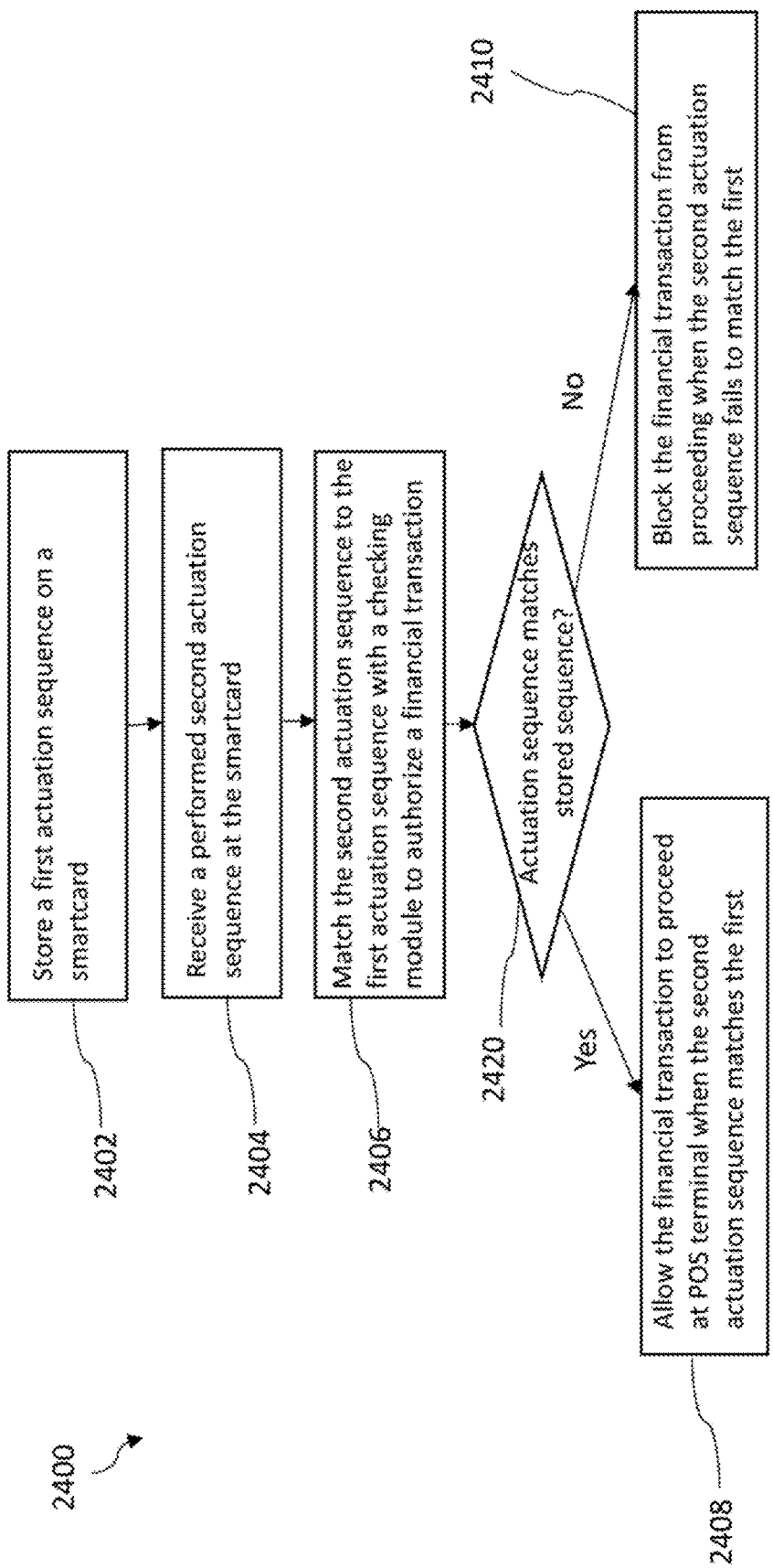
FIG. 15 is a flow chart of a method for increasing security in a financial transaction when using a smartcard.

Turning now to FIG. 15, there is a flow chart of a method 2400 for increasing security in a financial transaction when using a smartcard 602.

At 2402, a first actuation sequence is stored on the smartcard 602 at memory 902.

At 2404, a performed second actuation sequence is received at the smartcard 602 at input module 906.

At 2406, the second actuation sequence is matched to the stored first actuation sequence with checking module 932 to authorize the financial transaction.

If the second actuation sequence matches the stored first actuation sequence at 2420, the financial transaction proceeds to 2408. If the actuation sequence does not match the stored first actuation sequence at 2420, the financial transaction proceeds to 2410.

At 2408, the financial transaction is allowed to proceed at the point of sale terminal when the second actuation sequence matches the stored first actuation sequence.

At 2410, the financial transaction is blocked from proceeding at the point of sale when the second actuation sequence fails to match the stored first actuation sequence.

Figure 16:
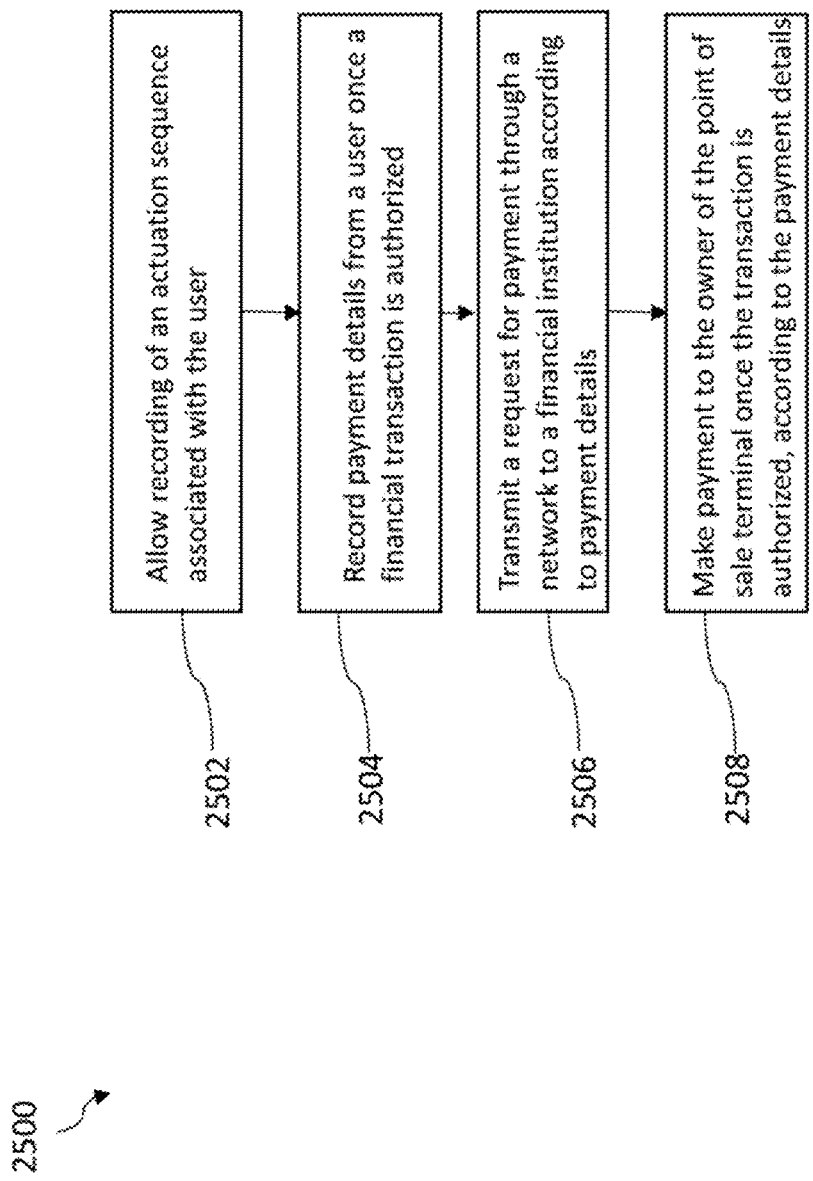
FIG. 16 is a flow chart of a method for increasing security in a financial transaction when using a point of sale terminal.

Turning now to FIG. 16, there is a flow chart of a method 2500 for increasing security in a financial transaction when using a point of sale terminal 1900.

At 2502, a financial institution authorizing computer 2600 allows recording of an actuation sequence associated with the user at an interface 2602.

At 2504, a point of sale terminal 1900 records payment details from a user once the financial transaction is authorized according to information provided by the user to confirm the user's identity.

At 2506, the point of sale terminal 1900 transmits a request for payment through a network to a financial institution according to the payment details.

At 2508, the financial institution makes payment to the owner of the point of sale terminal 1900 once the transaction is authorized, according to the payment details.

Figure 17:
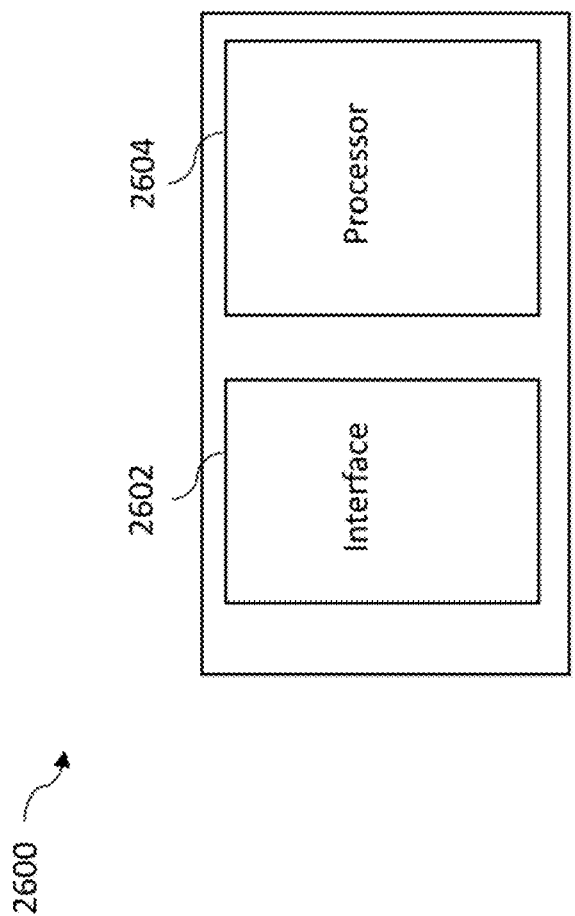
FIG. 17 is a block view of an authorizing computer for facilitating storage of an actuation sequence on a smartcard.

Turning now to FIG. 17, shown therein is a block view of an authorizing computer 2600 for facilitating storage of an actuation sequence on a smartcard 900.

The authorizing computer 2600 contains an interface 2602 for connecting with the smartcard 900.

The authorizing computer 2600 further contains a processor 2604 for allowing a user to store an actuation sequence on the smartcard 900 at the memory 902. The processor 2604 can determine whether the actuation sequence performed by the user was recorded by the smartcard 900. The processor can determine that the user needs to repeat the actuation sequence. The processor controls the authorization computer 2600 to signal success to the user once the actuation sequence is recorded by the smartcard 900.

The authorizing computer 2600 enables the smartcard 900 to accept the stored actuation sequence in subsequent financial transactions.

Figure 18:
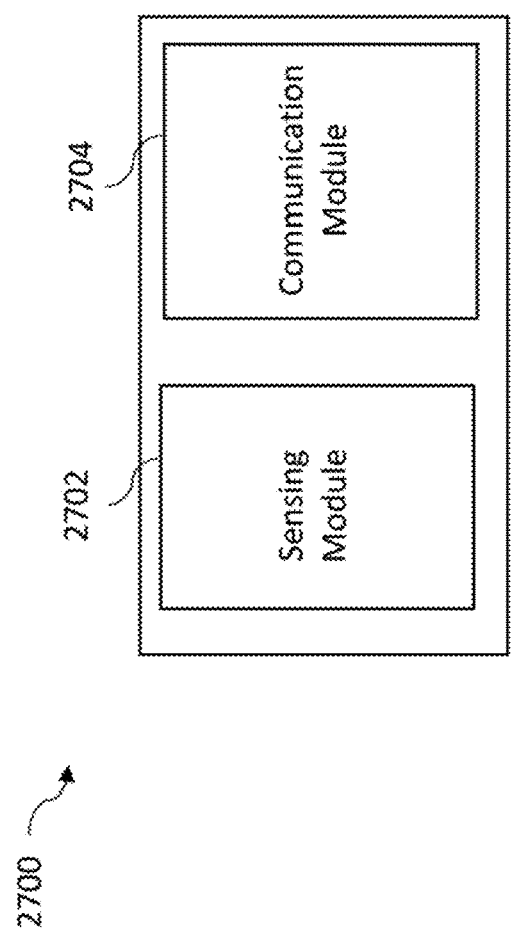
FIG. 18 is a block view of a biosensor for reading biometric information of a user of a smartcard.

Turning now to FIG. 18, shown therein is a block view of a biosensor 2700 for reading biometric information of a user of the smartcard 900.

The biosensor 2700 contains a sensing module 2702 for receiving biometric information of the user.

The biosensor 2700 further contains a communication module 2704 for transmitting received biometric information of the user to a smartcard 900 associated with the user in order to confirm the user's identity.

The biosensor 2700 is worn on the user's person. The biosensor 2700 can be associated to a smartcard 900 only when in the presence of an authorizing computer 2600.

Use of the actuation sequence by the user may be mandatory for all transactions beyond a preset minimum dollar amount. Use of the actuation sequence by the user may be optional. A transaction limit of the smartcard 602 may be increased when the actuation sequence is successfully supplied by the user.

The performing of financial transactions may be done using a contactless or NFC method of data exchange. The performing of financial transactions may be done using an insertion or contact method of data exchange.

Figure 19:
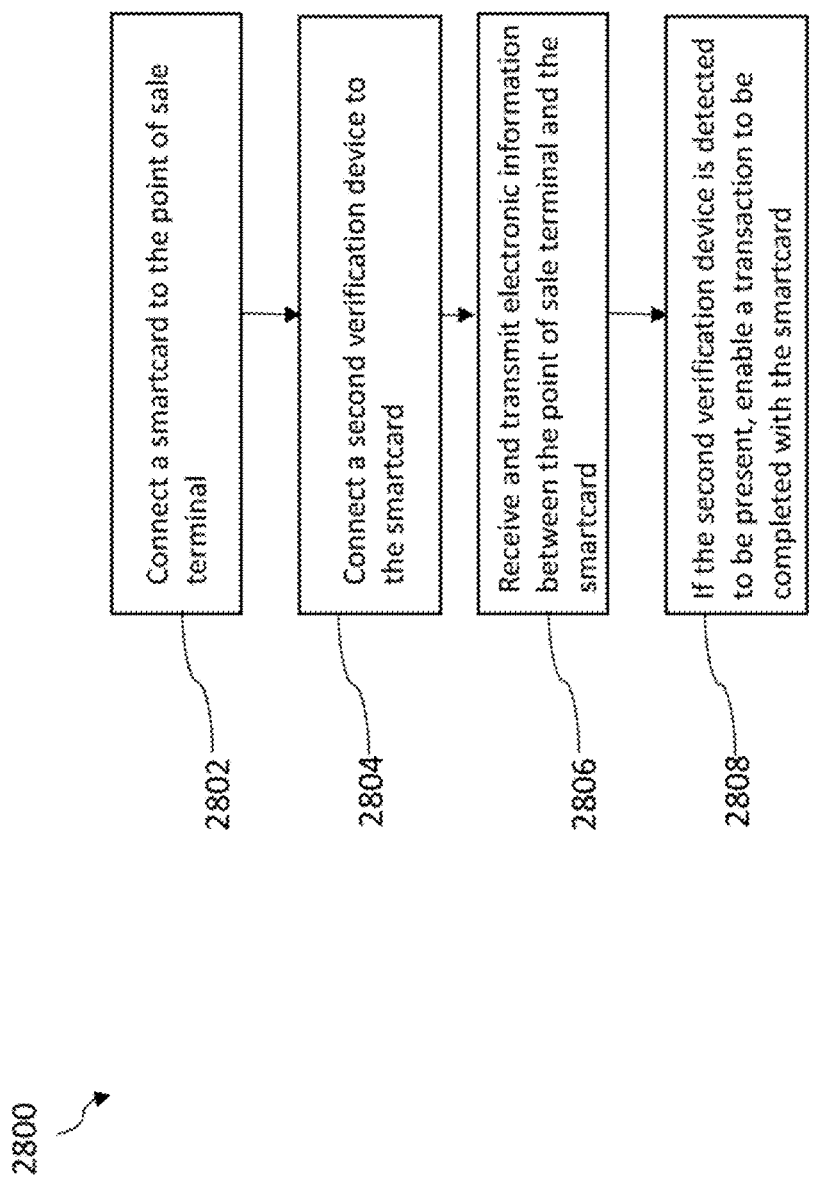
FIG. 19 is a flow chart of a method for verifying that a purchaser at a point of sale terminal is the legitimate owner of a smartcard.

Turning now to FIG. 19, shown therein is a flow chart of a method 2800 for verifying that a purchaser at a point of sale terminal 1900 is the legitimate owner of a smartcard 900.

At 2802, a smartcard 900 is connected to the point of sale terminal 1900.

At 2804, a second verification device, such as a biosensor 2700, is connected to the smartcard 900. The second verification device is a device for verifying the user.

At 2806, the smartcard 900 and the point of sale terminal 1900 receive and transmit electronic information.

At 2802, if the second verification device, such as a biosensor 2700, is detected to be present, then the financial transaction for which verification is sought is enabled to be completed with the smartcard 900.

The second verification device may be a mobile computing device. The second verification device may include a sensing module. The second verification device may contain a fingerprint scanner. The second verification device may include a camera for facial recognition. The second verification device may contain a camera capable of iris scanning. The second verification device may be a subdermal implant. The second verification device may be a smartwatch. The second verification device may be a second smartcard 900. The second verification device may be a security fob.

Figure 20:
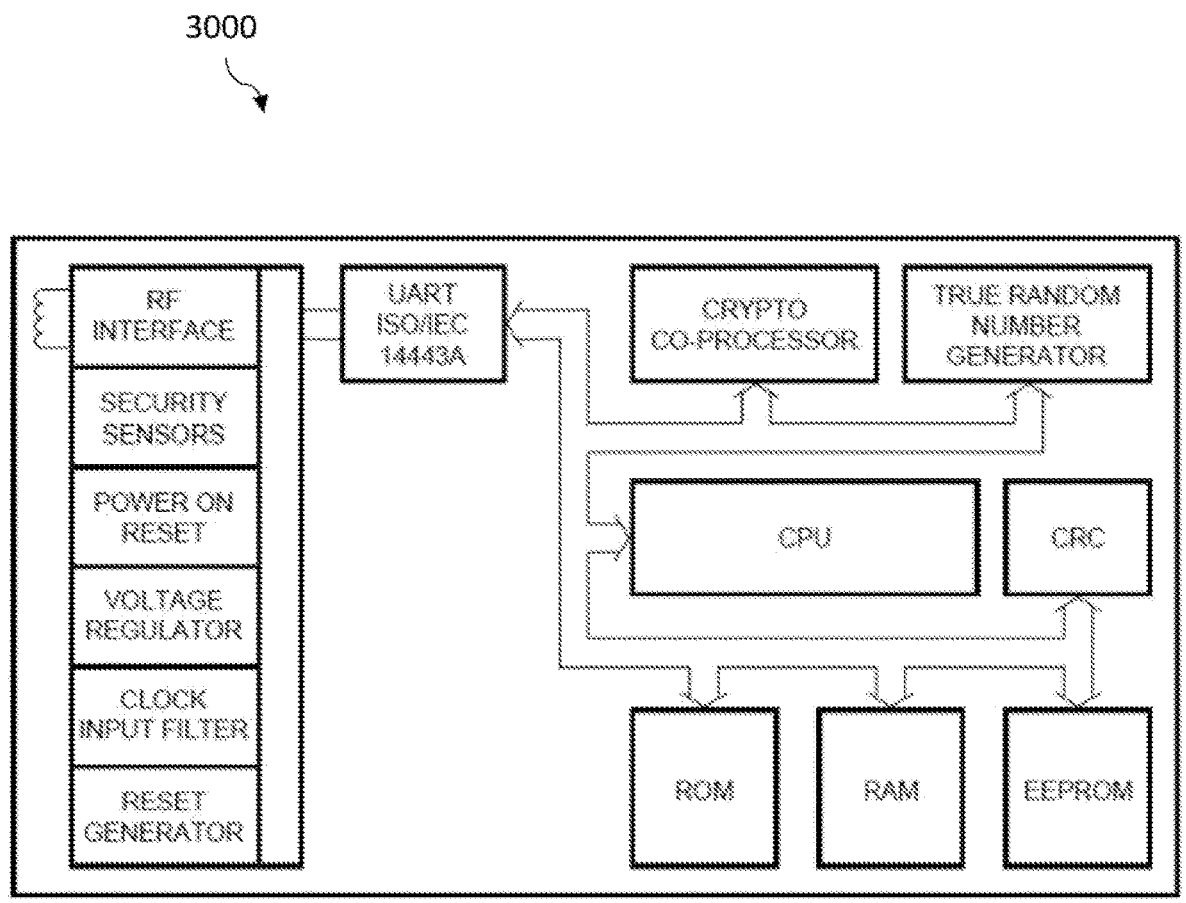
FIG. 20 is an illustration of a commercially available chip for a smartcard.

Turning now to FIG. 20, shown therein is an illustration of a commercially available chip 3000 for a smartcard.

The devices of the system may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. The processor may execute applications, computer readable instructions or programs. The applications, computer readable instructions, or programs may be stored in memory or in secondary storage, or may be received from the Internet or other network. An input device may include any device for entering information. For example, an input device may be a keyboard, key pad, cursor-control device, touch-screen, camera, or microphone. A display device may include any type of device for presenting visual information. For example, a display device may be a computer monitor, a flat-screen display, a projector, or a display panel. An output device may include any type of device for presenting a hard copy of information, such as a printer. An output device may also include other types of output devices such as speakers. In some cases, devices may include multiple of any one or more of processors, applications, software modules, secondary storage devices, network connections, input devices, output devices, and display devices.

Although devices are described with various components, one skilled in the art will appreciate that the devices may in some cases contain fewer, additional or different components. In addition, although aspects of an implementation of the devices may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices and/or processors to perform a particular method.

The devices may perform an act automatically or in response to an interaction by a user of that device. That is, the user of the device may manipulate one or more input devices (e.g. a touchscreen, a mouse, a button), causing the device to perform the described act. In many cases, this aspect may not be described below but will be understood.

As an example, the devices may send information to another device. For example, a user using the device may manipulate one or more input devices (e.g., a mouse and a keyboard) to interact with a user interface displayed on a display of the device. Generally, the device may receive a user interface from the network (e.g., in the form of a webpage). Alternatively or in addition, a user interface may be stored locally at a device (e.g., a cache of a webpage or a mobile application).

In response to receiving information, the device may store the information in a storage database. The storage may correspond with secondary storage of the device. Generally, the storage database may be any suitable storage device such as a hard disk drive, a solid state drive, a memory card, or a disk (e.g. CD, DVD, Blu-ray). Moreover, the storage database may be locally connected with the device. In some cases, the storage database may be located remotely from the device and accessible to the device across a network. In some cases, the storage database may comprise one or more storage devices located at a networked cloud storage provider.

The device may be associated with a user account. Any suitable mechanism for associating a device with an account is expressly contemplated. In some cases, a device may be associated with an account by sending credentials (e.g., a cookie, login, password). The credentials may be verified (e.g., determine that the received password matches a password associated with the account). If a device is associated with an account, further acts by that device may be considered to be associated with that account.

While the above description provides examples of one or more apparatus, methods, or systems, it will be appreciated that other apparatus, methods, or systems may be within the scope of the claims as interpreted by one of skill in the art.

The invention claimed is:

1. A system for increasing security in a financial transaction when using a smartcard, the system of computers comprising:
   a smartcard for payment in the financial transaction, the smartcard having a memory for storing a generated algorithm corresponding to a first actuation sequence for confirming an identity of a user of the smartcard, wherein the actuation sequence includes biometric information corresponding to the user and specific information known to the user, wherein the memory does not store the first actuation sequence, and wherein the first actuation sequence is not derivable from the generated algorithm;
   wherein the smartcard has a checking module that authorizes the financial transaction only upon determining that a second actuation sequence is identical to the first actuation sequence according to a comparison of the second actuation sequence via the generated algorithm;
   a point of sale terminal for recording payment details from the smartcard once the financial transaction is authorized and transmitting a request for payment through a network to a financial institution according to the payment details; and
   a computer of the financial institution for receiving the request for payment from the point of sale terminal, generating the algorithm corresponding to the first actuation sequence on the smartcard, and making payment once the transaction is authorized, according to the payment details;
   wherein the smartcard further comprises an active or passive power unit for harvesting energy from the point of sale terminal, through insertion of the smartcard at the point of sale terminal, or through proximity to the point of sale terminal, wherein the power unit is charged or activated by power from a powering coil, and wherein the power unit provides power to the smartcard.

2. The system of computers of claim 1, wherein the second actuation sequence is a series of finger taps made against one or more touch-sensitive pads located on the smartcard.

3. The system of computers of claim 1, wherein the second actuation sequence occurs by tracing out a pattern on a touch enabled part of the smartcard.

4. The system of computers of claim 1, wherein the biometric information is collected by a biometric sensor.

5. The system of computers of claim 1, wherein the second actuation sequence occurs when one or more actuation sequences are combined to activate the smartcard.

6. The system of computers of claim 1, wherein the smartcard includes an enable button and wherein only when the enable button is depressed can the second actuation sequence be performed.

7. The system of computers of claim 1, wherein the point of sale terminal queries the financial institution as to the sufficiency of funds in one or more accounts of the user.

8. The system of computers of claim 1, wherein a result of the matching of the second actuation sequence is indicated through at least one of an LED lamp, a sound alert, a color change, a message on a display, and a message on the point of sale terminal.

9. The system of computers of claim 1, wherein the biometric information comprises a heart rhythm or cardiac waveform of the user, wherein the biometric information is identified using spatial correlations in phase-space, the phase-space representation of a signal being constructed in real-time by delaying the signal by three distinct amounts to create three axes of the phase-space, and wherein the signal comprises heart rhythm or cardiac waveform information of the user, and wherein the system of computers further comprises a biometric sensor for collecting the biometric information or wherein the smartcard further comprises a circuit to measure the biometric information.

10. A method for a smartcard owner user of a smartcard to authorize use of a smartcard for a financial transaction, the method comprising:
    providing circuitry on the smartcard to enable storage of a generated algorithm corresponding to a first actuation sequence for confirming an identity of a user of the smartcard, wherein the first actuation sequence includes biometric information corresponding to the user and specific information known to the user, wherein the circuitry does not store the first actuation sequence, and wherein the first actuation sequence is not derivable from the generated algorithm;
    generating the algorithm corresponding to the first actuation sequence on the smartcard;
    storing the generated algorithm corresponding to the first actuation sequence on the circuitry while the smartcard is connected to an authorizing computer to indicate authorization at a financial institution; and
    performing a second actuation sequence with the smartcard to authorize the use of the smartcard for the financial transaction at a point of sale (POS) terminal;
    upon determining that the second actuation sequence is identical to the first actuation sequence according to a comparison of the second actuation sequence via the generated algorithm, performing the financial transaction with the point of sale terminal; and
    harvesting, at an active or passive power unit of the smartcard, energy from the point of sale terminal, through insertion of the smartcard at the point of sale terminal, or through proximity to the point of sale terminal, wherein the power unit is charged or activated by power from a powering coil, and wherein the power unit provides power to the smartcard.

11. The method of claim 10, wherein the second actuation sequence is a series of finger taps made against one or more touch-sensitive pads located on the smartcard.

12. The method of claim 10, wherein the second actuation sequence occurs by tracing out a pattern on a touch enabled part of the smartcard.

13. The method of claim 10, wherein the biometric information is collected by a biometric sensor.

14. The method of claim 10, wherein the second actuation sequence occurs when one or more actuation sequences are combined to activate the smartcard.

15. The method of claim 10, wherein the smartcard includes an enable button and wherein only when the enable button is depressed can the second actuation sequence be performed.

16. The method of claim 10, wherein the point of sale terminal queries the financial institution as to the sufficiency of funds in one or more accounts of the user.

17. The method of claim 10, wherein a result of the matching of the second actuation sequence is indicated through at least one of an LED lamp, a sound alert, a color change, a message on a display, and a message on the POS terminal.

18. The method of claim 10, wherein the biometric information comprises a heart rhythm or cardiac waveform of the user, wherein the biometric information is identified using spatial correlations in phase-space, the phase-space representation of a signal being constructed in real-time by delaying the signal by three distinct amounts to create three axes of the phase-space, and wherein the signal comprises heart rhythm or cardiac waveform information of the user, and wherein the method further comprises using a biometric sensor to collect the biometric information or using a circuit to measure the biometric information.

19. A smartcard for verifying user identity in a financial transaction, the smartcard comprising:
    a secure memory for storing a generated algorithm corresponding to a first actuation sequence for confirming an identity of a user of the smartcard, wherein the first actuation sequence includes biometric information corresponding to the user and specific information known to the user, wherein the secure memory does not store the first actuation sequence, and wherein the first actuation sequence is not derivable from the generated algorithm;
    an input module for receiving a second actuation sequence, wherein the input module receives the second actuation sequence from the user of the smartcard to verify user identity at the time of the financial transaction;
    a checking module that authorizes the financial transaction only upon determining that the second actuation sequence is identical to the first actuation sequence according to a comparison of the second actuation sequence via the generated algorithm; and
    a point of sale communication module for receiving and transmitting electronic information between a point of sale (POS) terminal and the smartcard when the checking module authorizes the financial transaction;
    wherein the smartcard further comprises an active or passive power unit for harvesting energy from the POS terminal, through insertion of the smartcard at the POS terminal, or through proximity to the POS terminal, wherein the power unit is charged or activated by power from a powering coil, and wherein the power unit provides power to the smartcard.

20. The smartcard of claim 19, wherein the biometric information comprises a heart rhythm or cardiac waveform of the user, wherein the biometric information is identified using spatial correlations in phase-space, the phase-space representation of a signal being constructed in real-time by delaying the signal by three distinct amounts to create three axes of the phase-space, and wherein the signal comprises heart rhythm or cardiac waveform information of the user, and wherein the system of computers further communicates with a biometric sensor for collecting the biometric information or wherein the smartcard further comprises a circuit to measure the biometric information.

\* \* \* \* \*